(12) United States Patent
Yano et al.

(10) Patent No.: US 11,991,348 B2
(45) Date of Patent: May 21, 2024

(54) INFORMATION PROCESSING DEVICE AND METHOD

(71) Applicant: SONY GROUP CORPORATION, Tokyo (JP)

(72) Inventors: Koji Yano, Tokyo (JP); Hiroyuki Yasuda, Saitama (JP); Tsuyoshi Kato, Kanagawa (JP); Satoru Kuma, Tokyo (JP); Ohji Nakagami, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 67 days.

(21) Appl. No.: 17/620,412

(22) PCT Filed: Jun. 11, 2020

(86) PCT No.: PCT/JP2020/023040
§ 371 (c)(1),
(2) Date: Dec. 17, 2021

(87) PCT Pub. No.: WO2020/262019
PCT Pub. Date: Dec. 30, 2020

(65) Prior Publication Data
US 2022/0353492 A1    Nov. 3, 2022

(30) Foreign Application Priority Data

Jun. 25, 2019  (JP) .................... 2019-116969

(51) Int. Cl.
*H04N 19/103*    (2014.01)
*G06T 9/40*    (2006.01)
(Continued)

(52) U.S. Cl.
CPC .............. *H04N 19/103* (2014.11); *G06T 9/40* (2013.01); *H04N 19/124* (2014.11); *H04N 19/96* (2014.11)

(58) Field of Classification Search
CPC .... H04N 19/103; H04N 19/124; H04N 19/96; G06T 9/40
See application file for complete search history.

(56) References Cited

U.S. PATENT DOCUMENTS

2014/0043436 A1* 2/2014 Bell ..................... H04N 13/204
348/46
2019/0080483 A1* 3/2019 Mammou ............ H04N 19/593
(Continued)

FOREIGN PATENT DOCUMENTS

CA    3078455 A1 *  5/2019 ............... G06T 1/00
CN    110058594 A  *  7/2019 ........... G05D 1/0214
(Continued)

OTHER PUBLICATIONS

Fang, Zheng Translation of CN 110058594 A, Apr. 2019 (Year: 2019).*

(Continued)

*Primary Examiner* — Zaihan Jiang
(74) *Attorney, Agent, or Firm* — Paratus Law Group, PLLC

(57) ABSTRACT

The present disclosure relates to an information processing device and a method capable of suppressing a reduction in encoding efficiency of point cloud data. As for a point cloud representing an object having a three-dimensional shape as a point group, position information of a point to be processed is predicted on the basis of position information of a reference point, position information of a prediction point is generated, a difference between the generated position information of the prediction point and the position information of the point to be processed is derived, the derived difference is encoded, and a bitstream is generated. The present disclosure may be applied to, for example, an information
(Continued)

processing device, an electronic device, an information processing method, a program or the like.

22 Claims, 21 Drawing Sheets

(51) Int. Cl.
*H04N 19/124* (2014.01)
*H04N 19/96* (2014.01)

(56) References Cited

U.S. PATENT DOCUMENTS

| | | | |
|---|---|---|---|
| 2020/0014940 A1* | 1/2020 | Dawar | G06T 9/001 |
| 2020/0020132 A1* | 1/2020 | Sinharoy | H03M 7/3059 |
| 2020/0020133 A1* | 1/2020 | Najaf-Zadeh | G06T 9/00 |
| 2020/0107033 A1* | 4/2020 | Joshi | H04N 19/44 |
| 2020/0112745 A1* | 4/2020 | Joshi | H04N 13/275 |
| 2021/0142521 A1* | 5/2021 | Iguchi | G06T 9/00 |
| 2022/0343551 A1* | 10/2022 | Iguchi | G06T 9/001 |
| 2023/0099605 A1* | 3/2023 | Georgis | G06T 9/001 345/420 |

FOREIGN PATENT DOCUMENTS

| | | |
|---|---|---|
| JP | 2017-126893 A | 7/2017 |
| WO | WO 2019/082837 A1 | 5/2019 |

OTHER PUBLICATIONS

Mekuria et al., Design, Implementation and Evaluation of a Point Cloud Codec for Tele-Immersive Video, IEEE Transactions on Circuits and Systems for Video Technology, Jan. 2016, pp. 1-14.

Lasserre et al., [PCC] Inference of a mode using point location direct coding in TMC3, International Organisation for Standardisation ISO/IEC JTC1/SC29/WG11 Coding of Moving Pictures and Audio, Jan. 2018, pp. 1-8, Gwangju, Korea.

* cited by examiner

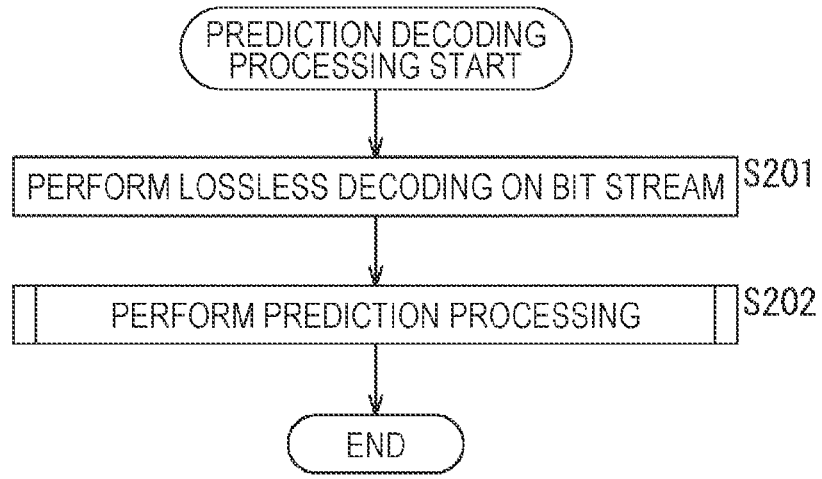
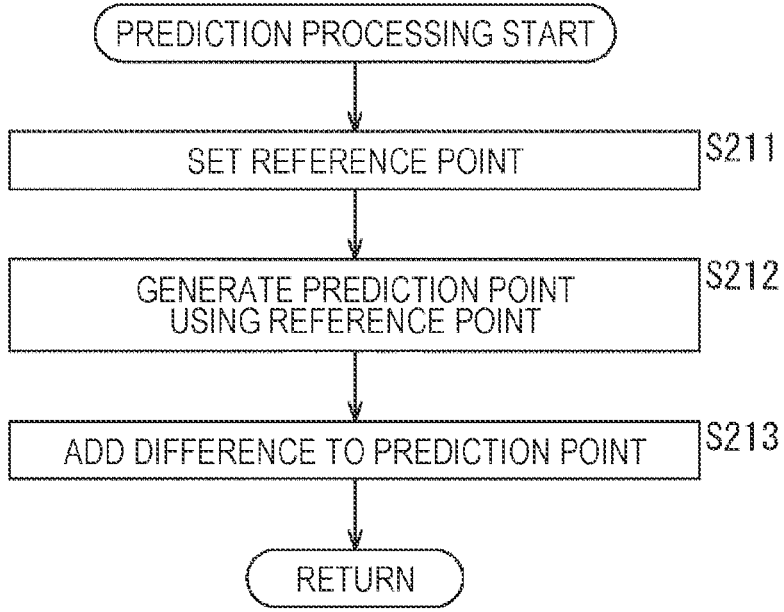

FIG. 9

| | | |
|---|---|---|
| 2 | PERFORM MODE DETERMINATION | USAGE IN COMBINATION WITH DCM OPTIMIZATION FOR VARIOUS DATA |
| 2-1 | TRANSFER MODE INFORMATION | REDUCTION IN DECODING LOAD |
| 2-1-1 | PERFORM DETERMINATION BASED ON RD COST | SELECTION OF OPTIMAL MODE |
| 2-2 | PERFORM COMMON MODE DETERMINATION WHEN ENCODING AND DECODING | IMPROVEMENT IN ENCODING EFFICIENCY |
| 2-2-1 | DETERMINE ALL IN PREDICTION MODE | EASE OF ENCODING/DECODING LOAD |
| 2-2-2 | DETERMINE ACCORDING TO LoD OF TARGET NODE | EASE OF ENCODING/DECODING LOAD SUPPRESSION OF ENCODING EFFICIENCY REDUCTION |
| 2-2-3 | DETERMINE ACCORDING TO PRESENCE OR ABSENCE OF PERIPHERAL POINT | SUPPRESSION OF ENCODING EFFICIENCY REDUCTION |

FIG. 21

| 3 | PREDICTION METHOD | |
|---|---|---|
| 3-1 | MAKE CENTER OF GRAVITY OF ADJACENT N POINTS PREDICTION POINT | SUPPRESSION OF LOAD INCREASE |
| 3-1-1 | ADJACENT POINTS INCLUDE PARENT NODE | SECUREMENT OF PREDICTION ACCURACY |
| 3-1-2 | N IS FIXED (TRANSFER IS NOT REQUIRED) | SUPPRESSION OF LOAD INCREASE |
| 3-1-3 | N IS VARIABLE (TRANSFER IS REQUIRED) | IMPROVEMENT IN PREDICTION ACCURACY |
| 3-2 | M-DIMENSIONAL FUNCTION Fitting FROM ADJACENT N POINTS | IMPROVEMENT IN PREDICTION ACCURACY |
| 3-2-2 | N IS FIXED (TRANSFER IS NOT REQUIRED) | SUPPRESSION OF LOAD INCREASE |
| 3-2-3 | N IS VARIABLE (TRANSFER IS REQUIRED) | IMPROVEMENT IN PREDICTION ACCURACY |
| 3-3 | OTHER GENERAL INTERPOLATION IS USED | OPTIMIZATION ACCORDING TO CASE |

FIG. 22

| 4 | QUANTIZATION OF DIFFERENCE | |
|---|---|---|
| 4-1 | QUANTIZATION IS NOT PERFORMED (Lossless) | HIGH IMAGE QUALITY |
| 4-2 | BIT AMOUNT IS FIXED (Lossy) | IMPROVEMENT IN ENCODING EFFICIENCY |
| 4-3 | BIT AMOUNT IS VARIABLE FOR EACH POINT (Lossy) | IMAGE QUALITY IS CONTROLLABLE FOR EACH POINT |
| 4-4 | BIT AMOUNT IS VARIABLE FOR EACH NODE (Lossy) | IMAGE QUALITY IS CONTROLLABLE FOR EACH REGION SUPPRESSION OF ENCODING EFFICIENCY REDUCTION |
| 4-5 | BIT AMOUNT IS VARIABLE FOR EACH LoD (Lossy) | IMAGE QUALITY IS CONTROLLABLE ACCORDING TO RESOLUTION SUPPRESSION OF ENCODING EFFICIENCY REDUCTION |

FIG. 23

| 5 | PROCESS DCM/PREDICTION AFTER Octree | | |
|---|---|---|---|
| 5-1 | PROCESSING ORDER IN DCM/PREDICTION | | |
| 5-1-1 | | ORDER FROM SHALLOW LoD | IMPROVEMENT IN DENSE POINT PREDICTION ACCURACY |
| 5-1-2 | | ORDER FROM DEEP LoD | IMPROVEMENT IN SPARSE POINT PREDICTION ACCURACY |
| 5-1-3 | | ORDER OF MORTON CODE | SECUREMENT OF ADJACENT POINT |
| 5-1-4 | | SORT IN ORDER OF MORTON CODE AND THEN ORDER OF BINARY SEARCH | IMPROVEMENT IN PREDICTION ACCURACY |

INFORMATION PROCESSING DEVICE AND METHOD

CROSS REFERENCE TO PRIOR APPLICATION

This application is a National Stage Patent Application of PCT International Patent Application No. PCT/JP2020/023040 (filed on Jun. 11, 2020) under 35 U.S.C. § 371, which claims priority to Japanese Patent Application No. 2019-116969 (filed on Jun. 25, 2019), which are all hereby incorporated by reference in their entirety.

TECHNICAL FIELD

The present disclosure relates to an information processing device and a method, and especially relates to an information processing device and a method capable of suppressing a reduction in encoding efficiency of point cloud data.

BACKGROUND ART

Conventionally, as a method for encoding 3D data representing a three-dimensional structure such as a point cloud, for example, there has been encoding using octree (refer to, for example, Non-Patent Document 1).

In recent years, a direct coding mode (DCM) has been proposed for encoding, in a node having a specific number or less of leaves in the octree, a relative distance from the node to each leaf (refer to, for example, Non-Patent Document 2).

CITATION LIST

Non-Patent Document

Non Patent Document 1: R. Mekuria, Student Member IEEE, K. Blom, P. Cesar., Member, IEEE, "Design, Implementation and Evaluation of a Point Cloud Codec for Tele-Immersive Video", tcsvt_paper_submitted_february.pdf Non Patent Document 2: Sebastien Lasserre, David Flynn, "[PCC] Inference of a mode using point location direct coding in TMC3", ISO/IEC JTC1/SC29/WG11 MPEG2018/m42239, January 2018, Gwangju, Korea

SUMMARY OF THE INVENTION

Problems to be Solved by the Invention

However, in data mainly including sparse points such as light detection and ranging (LiDAR) data, substantially all the points are processed by this DCM. Since the DCM is an uncompressed process, in such a case, the encoding efficiency of the point cloud data might be deteriorated.

The present disclosure is achieved in view of such a situation, and an object thereof is to suppress the reduction in encoding efficiency of the point cloud data.

Solutions to Problems

An information processing device according to one aspect of the present technology is an information processing device provided with a prediction unit that predicts position information of a point to be processed on the basis of position information of a reference point and generates position information of a prediction point as for a point cloud that represents an object having a three-dimensional shape as a point group, a difference derivation unit that derives a difference between the position information of the prediction point generated by the prediction unit and the position information of the point to be processed, and an encoding unit that encodes the difference derived by the difference derivation unit and generates a bitstream.

An information processing method according to one aspect of the present technology is an information processing method provided with predicting position information of a point to be processed on the basis of position information of a reference point and generating position information of a prediction point as for a point cloud that represents an object having a three-dimensional shape as a point group, deriving a difference between the position information of the prediction point that is generated and the position information of the point to be processed, and encoding the difference that is derived and generating a bitstream.

An information processing device according to another aspect of the present technology is an information processing device provided with a decoding unit that decodes encoded data encoded using prediction of position information of a point to be processed of a point cloud that represents an object having a three-dimensional shape as a point group, and generates a difference between the position information of a prediction point predicted on the basis of position information of a reference point and the position information of the point to be processed corresponding to the prediction point, a prediction unit that predicts the position information of the point to be processed on the basis of the position information of the reference point and generates the position information of the prediction point as for the point cloud, and an addition unit that adds the position information of the prediction point generated by the prediction unit to the difference generated by the decoding unit and derives the position information of the point to be processed.

An information processing method according to another aspect of the present technology is an information processing method provided with: decoding encoded data encoded using prediction of position information of a point to be processed of a point cloud that represents an object having a three-dimensional shape as a point group, and generating a difference between position information of a prediction point predicted on the basis of position information of a reference point and the position information of the point to be processed corresponding to the prediction point, predicting the position information of the point to be processed on the basis of the position information of the reference point and generating the position information of the prediction point as for the point cloud, and adding the position information of the prediction point that is generated to the difference that is generated and deriving the position information of the point to be processed.

In an information processing device and a method according to one aspect of the present technology, as for a point cloud that represents an object having a three-dimensional shape as a point group, position information of a point to be processed is predicted on the basis of position information of a reference point and position information of a prediction point is generated, a difference between the position information of the prediction point that is generated and the position information of the point to be processed is derived, and the difference that is derived is encoded and a bitstream is generated.

In an information processing device and a method according to another aspect of the present technology, encoded data encoded using prediction of position information of a point to be processed of a point cloud that represents an object having a three-dimensional shape as a point group is decoded, and a difference between position information of a prediction point predicted on the basis of position information of a reference point and the position information of the point to be processed corresponding to the prediction point is generated, the position information of the point to be processed is predicted on the basis of the position information of the reference point and the position information of the prediction point is generated as for the point cloud, and the position information of the prediction point that is generated is added to the difference that is generated and the position information of the point to be processed is derived.

BRIEF DESCRIPTION OF DRAWINGS

FIG. 7 is a flowchart for illustrating an example of a flow of a prediction decoding process.
FIG. 8 is a flowchart for illustrating an example of a flow of a prediction process.
FIG. 9 is a diagram for illustrating mode determination.
FIG. 21 is a diagram for illustrating prediction.
FIG. 22 is a diagram for illustrating difference quantization.
FIG. 23 is a diagram for illustrating a processing order.

MODE FOR CARRYING OUT THE INVENTION

Figure 1:
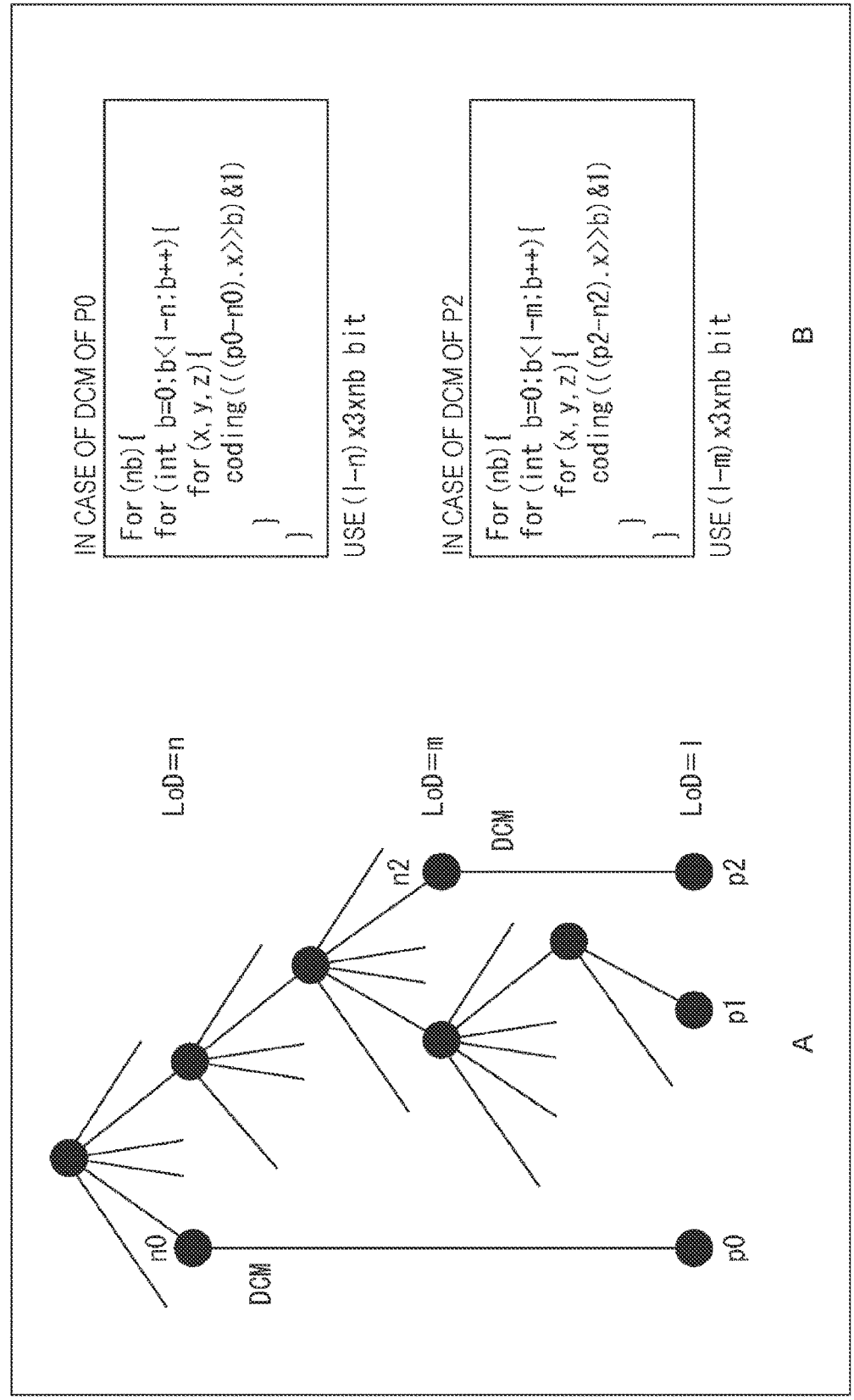
FIG. 1 is a diagram for illustrating a DCM.

Modes for carrying out the present disclosure (hereinafter, referred to as embodiments) are hereinafter described. Note that, the description is given in the following order.

1. Encoding and Decoding Using Prediction
2. First Embodiment (Prediction Encoding Device/Prediction Decoding Device)
3. Second Embodiment (Encoding Device/Decoding Device (Mode Determination))
4. Third Embodiment (Prediction Method)
5. Fourth Embodiment (Difference Quantization)
6. Fifth Embodiment (Processing Order)
7. Appendix 1. Encoding and Decoding Using Prediction <Documents Supporting Technical Contents and Technical Terms and the Like>

The scope disclosed in the present technology includes not only contents described in embodiments but also contents disclosed in following non-patent documents well-known when filing.

Non-Patent Document 1: (mentioned above)
Non-Patent Document 2: (mentioned above)
Non-Patent Document 3: TELECOMMUNICATION STANDARDIZATION SECTOR OF ITU (International Telecommunication Union), "Advanced video coding for generic audiovisual services", H.264, 04/2017
Non-Patent Document 4: TELECOMMUNICATION STANDARDIZATION SECTOR OF ITU (International Telecommunication Union), "High efficiency video coding", H.265, 12/2016
Non-Patent Document 5: Jianle Chen, Elena Alshina, Gary J. Sullivan, Jens-Rainer, Jill Boyce, "Algorithm Description of Joint Exploration Test Model 4", JVET-G 1001_v1, Joint Video Exploration Team (JVET) of ITU-T SG 16 WP 3 and ISO/IEC JTC 1/SC 29/WG 11 7th Meeting: Torino, IT, 13-21 Jul. 2017

That is, the contents disclosed in Non-Patent Documents mentioned above also serve as a basis for determining support requirements. For example, even when a quad-tree block structure disclosed in Non-Patent Document 4 and a quad tree plus binary tree (QTBT) block structure disclosed in Non-Patent Document 5 are not directly described in the embodiments, they fall within the disclosure scope of the present technology and satisfy the support requirements of claims. Furthermore, for example, technical terms such as parsing, syntax, and semantics are similarly within the disclosure scope of the present technology even when there is no direct description in the embodiment, and satisfy the support requirements of claims.

<Point Cloud>

Conventionally, there has been 3D data such as a point cloud representing a three-dimensional structure by position information, attribute information and the like of a point group, a mesh including vertices, edges, and surfaces that defines a three-dimensional shape using polygonal representation and the like.

For example, in a case of the point cloud, a stereoscopic structure (object having a three-dimensional shape) is represented as a set (point group) of a large number of points (also referred to as points). Data of the point cloud (also referred to as point cloud data) includes position information and attribute information (for example, color and the like) of each point (each point). The position information (also referred to as geometry data) is information indicating a position (for example, coordinates) of a point. The attribute information (also referred to as attribute data) includes arbitrary information regarding the point such as, for example, a color, reflectance, a normal direction and the like of the point. In this manner, the point cloud has a relatively simple data structure, and may represent an arbitrary stereoscopic structure with sufficient accuracy by using a sufficiently large number of points.

<Quantization of Position Information Using Voxel>

Since such point cloud data has a relatively large data amount, an encoding method using a voxel has been considered in order to compress the data amount by encoding and the like. The voxel is a three-dimensional region for quantizing the position information.

That is, the three-dimensional region including the point cloud is divided into small three-dimensional regions referred to as voxels, and it is indicated whether or not the point is included for each voxel. By doing so, the position of each point is quantized in voxel unit. Therefore, by converting the point cloud data into data of such voxel (also referred to as voxel data), an increase in information amount may be suppressed (typically, the information amount may be reduced).

<Octree>

Moreover, it has been considered to construct an octree using such voxel data. The octree is obtained by converting the voxel data into a tree structure. A value of each bit of a lowest node in the octree indicates presence or absence of the point in each voxel. For example, a value "1" indicates the voxel including the point, and a value "0" indicates the voxel not including the point. In the octree, one node corresponds to eight voxels. That is, each node of the octree includes eight-bit data, and the eight bits indicate the presence or absence of the point in the eight voxels, respectively.

Then, an upper node of the octree indicates presence or absence of the point in a region obtained by collecting the eight voxels corresponding to a lower node belonging to this node into one. That is, the upper node is generated by collecting information of the voxels of the lower node. Note that, in a case of the node having the value "0", that is, when all the corresponding eight voxels do not include the point, this node is deleted.

By doing so, the tree structure (octree) including the nodes having the value other than "0" is constructed. That is, the octree may indicate presence or absence of the point in the voxel at each resolution. Therefore, by converting the voxel data into the octree and encoding the same, the voxel data at various resolutions may be more easily restored at the time of decoding. That is, scalability of the voxels may be more easily realized.

Furthermore, by omitting the node having the value "0" as described above, the resolution of the voxel in the region where the point is not present may be made low, so that it is possible to further suppress the increase in information amount (typically, reduce the information amount).

<DCM>

When the points are in a dense state (when there are many points in the vicinity), scalability of the number of points may be realized by conversion into octree. However, when the points are in a sparse state (when there are few points in the vicinity), the number of points does not significantly change although the resolution in a position of the point in each level of the octree changes. That is, the node with fewer branches is formed under a sparse node, and a value as the tree structure is reduced. That is, when the points are in the sparse state, a process of generating the node of a low value increases, and a processing amount might unnecessarily increase.

Therefore, in recent years, as disclosed in Non-Patent Document 2, for example, a direct coding mode (DCM) has been proposed in which, in the node in which the number of leaves (the nodes in the lowest layer of the octree, that is, the points at highest resolution) is equal to or smaller than a specific number in the octree, a relative distance from the node to each leaf is encoded. That is, in a case of the DCM, the relative distance (in xyz directions) from a node to be processed to each leaf directly or indirectly belonging to the node to be processed is obtained and encoded. For example, when the node in a sparse state is generated in the conversion of the voxels into the octree, such DCM is applied. By applying the DCM in this manner, generation of the octree belonging to the node to be processed may be omitted. That is, the generation of the octree (that is, the encoding process) may be performed more easily and at a higher speed.

However, this DCM is an uncompressed process. In a case of the DCM, the relative distance from the node to be processed to the leaf in the xyz directions is indicated by a bit length. For example, as illustrated in A of FIG. 1, it is assumed that a level (LoD) of a sparse node n0 in the octree is n(LoD=n), and a level of a sparse leaf p0 belonging to the node n0 is 1 (LoD=1). In a case of the DCM, the relative distance from the node n0 to the leaf p0 is represented by (1−n)×3×nB (bit) as in an upper part in B of FIG. 1. Similarly, it is assumed that a level (LoD) of a sparse node n2 in the octree in A of FIG. 1 is n(LoD=m), and a level of a sparse leaf p2 belonging to the node n2 is 1 (LoD=1). In a case of the DCM, the relative distance from the node n2 to the leaf p2 is represented by (1−m)×3×nB (bit) as in a lower part in B of FIG. 1.

For example, in a case of point cloud data mainly including sparse points such as light detection and ranging (LiDAR) data, this DCM is applied to substantially all the points. That is, encoding is performed without the data amount reduced. Therefore, there has been a possibility that encoding efficiency is reduced.

<Application of Prediction>

Therefore, it is possible to predict a point to be processed using a reference point, and obtain a difference in position information between the generated prediction point and the point to be processed.

Figure 2:
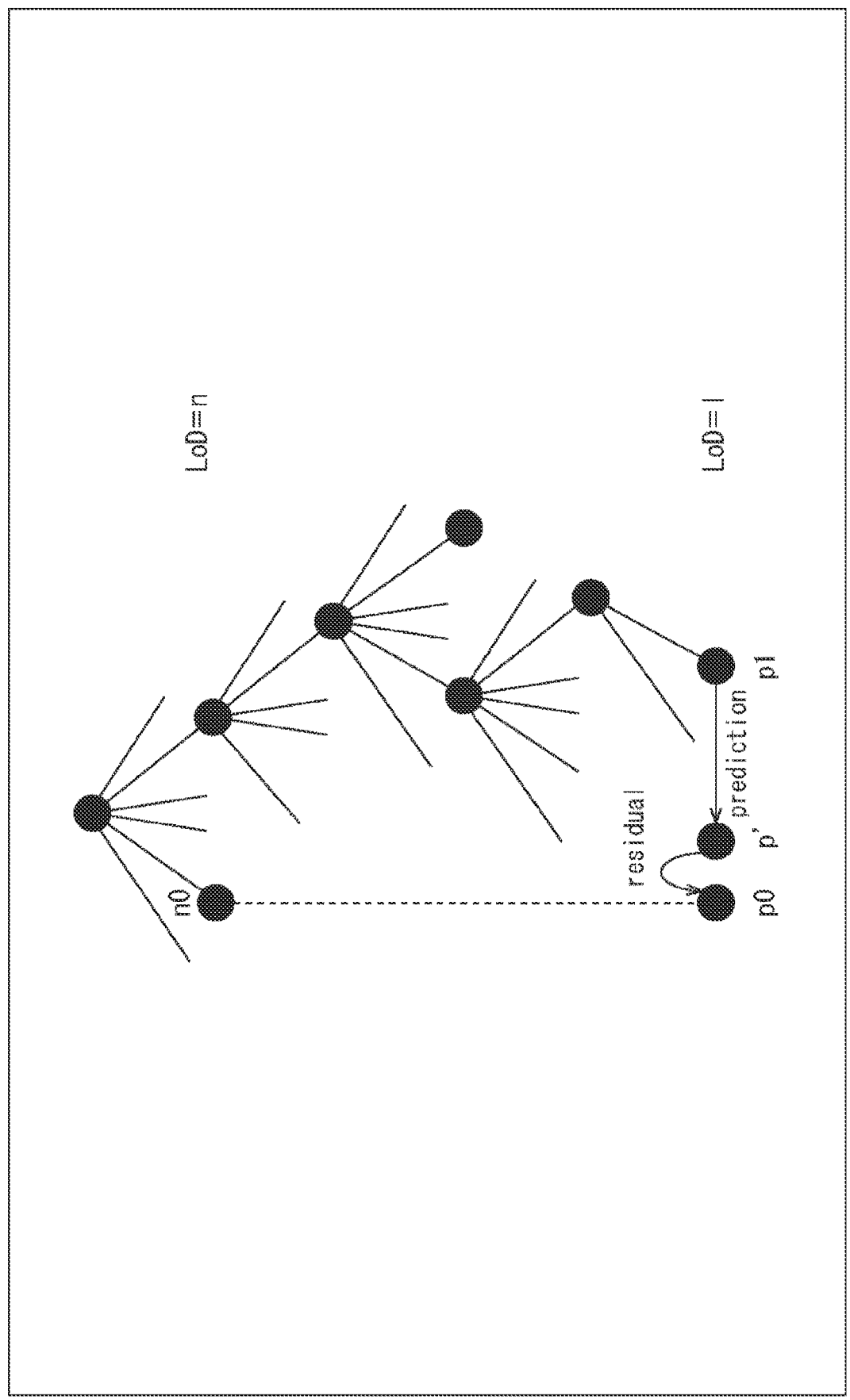
FIG. 2 is a diagram for illustrating prediction.

For example, as illustrated in FIG. 2, the sparse leaf p0 belonging to the sparse node n0 in the octree of the position information is made the point to be processed, prediction of the leaf p0 is performed using a leaf p1 as the reference point to generate a prediction point p', and a difference (residual) between the leaf p0 and the prediction point p' is obtained. A data amount of the difference obtained in this manner is smaller than that of the leaf p0. That is, by encoding/decoding the difference obtained in this manner, it is possible to suppress the reduction in encoding efficiency of the point cloud data as compared with a case of directly encoding/decoding the leaf p1.

2. First Embodiment

<Prediction Encoding Device>

For example, as for a point cloud representing an object having a three-dimensional shape as a point group, it is possible to predict position information of a point to be processed on the basis of position information of a reference point, generate position information of a prediction point, derive a difference between the generated position information of the prediction point and the position information of the point to be processed, and encode the derived difference to generate a bitstream.

For example, an information processing device may be provided with a prediction unit that predicts position information of a point to be processed on the basis of position information of a reference point and generates position information of a prediction point as for a point cloud that represents an object having a three-dimensional shape as a point group, a difference derivation unit that derives a difference between the position information of the prediction point generated by the prediction unit and the position information of the point to be processed, and an encoding unit that encodes the difference derived by the difference derivation unit and generates a bitstream.

By encoding the difference in this manner, it is possible to suppress a reduction in encoding efficiency of the point cloud data.

Figure 3:
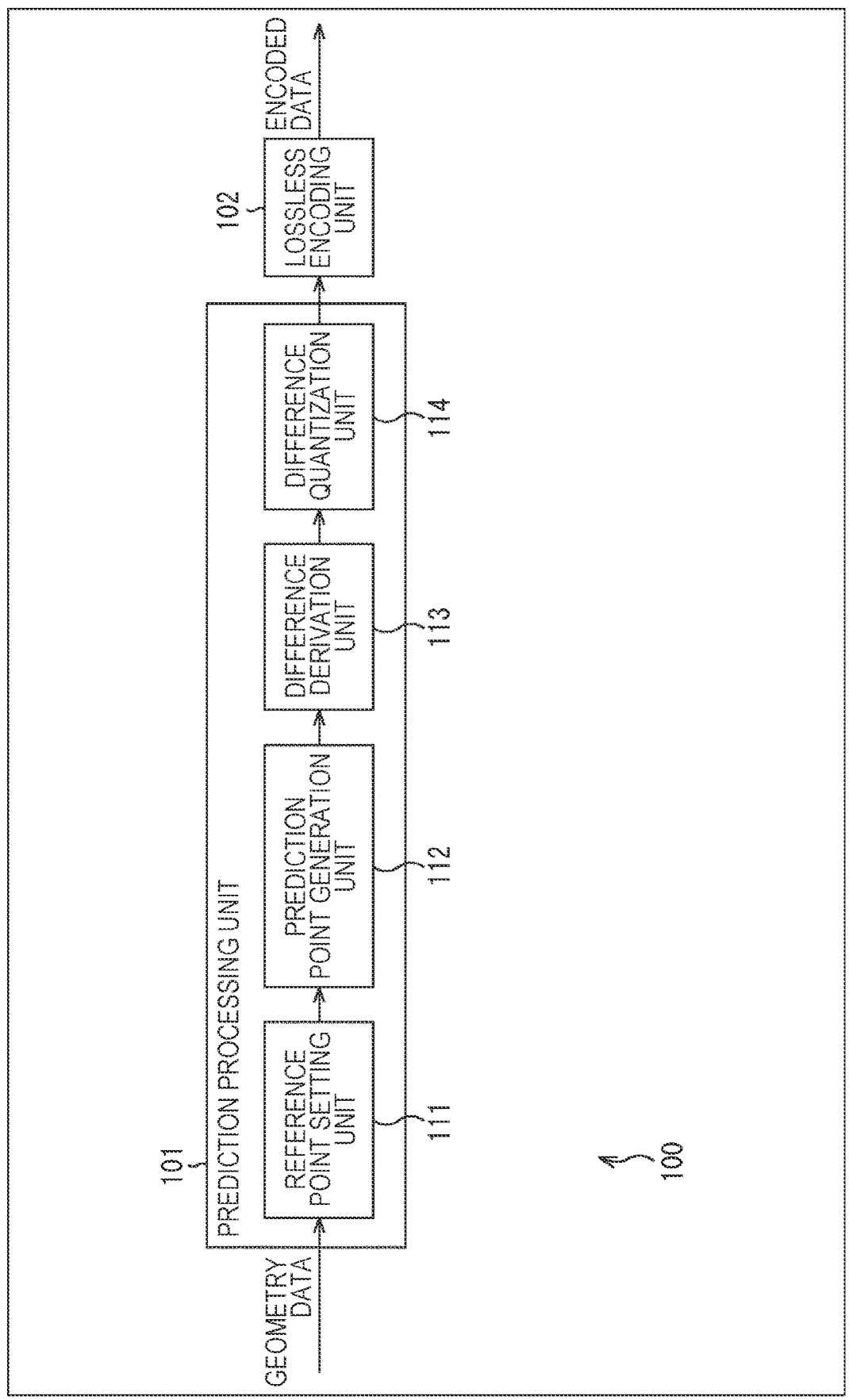
FIG. 3 is a block diagram illustrating a principal configuration example of a prediction encoding device.

A more specific example is described. FIG. 3 is a block diagram illustrating an example of a configuration of a prediction encoding device as an aspect of the information processing device to which the present technology is applied. A prediction encoding device 100 illustrated in FIG. 3 is a device that encodes geometry data using prediction and generates encoded data thereof.

Note that, in FIG. 3, principal ones among processing units, data flows and the like are illustrated, and not all of them are illustrated in FIG. 3. That is, in the prediction encoding device 100, there may be a processing unit not illustrated as a block in FIG. 3, or there may be a process or a data flow not illustrated as an arrow and the like in FIG. 3.

As illustrated in FIG. 3, the prediction encoding device 100 includes a prediction processing unit 101 and a lossless encoding unit 102.

The prediction processing unit 101 performs a process regarding point prediction. For example, the prediction processing unit 101 obtains geometry data of a point cloud. Furthermore, the prediction processing unit 101 sets, for a point to be predicted (also referred to as a point to be processed) included in the geometry data, a reference point corresponding to the point to be processed. The reference point is a point a position of which is referred to at the time of prediction. When there is a plurality of points to be processed, the prediction processing unit 101 sets the reference point for each of the points to be processed.

Moreover, the prediction processing unit 101 performs prediction regarding a position of each point to be processed and generates a prediction point. The prediction point is a result of predicting the position of the point to be processed, that is, a virtual point provided in a predicted position. The prediction processing unit 101 refers to the position of the reference point corresponding to each point to be processed, and predicts the position of the point to be processed on the basis of the position of the reference point (generates the prediction point).

Furthermore, the prediction processing unit 101 derives a difference between the position of the point to be processed and the position of the prediction point. When there is a plurality of points to be processed, the prediction processing unit 101 derives the difference for each of the points to be processed. The prediction processing unit 101 quantizes the derived difference and supplies the same to the lossless encoding unit 102.

As illustrated in FIG. 3, the prediction processing unit 101 is provided with a reference point setting unit 111, a prediction point generation unit 112, a difference derivation unit 113, and a difference quantization unit 114.

The reference point setting unit 111 performs a process regarding setting of the reference point. For example, the reference point setting unit 111 obtains the geometry data supplied from the outside of the prediction processing unit 101. Furthermore, the reference point setting unit 111 sets the reference point corresponding to the point to be processed for the geometry data. The reference point setting is described later in detail. The reference point setting unit 111 supplies information regarding the set reference point and the geometry data to the prediction point generation unit 112.

The prediction point generation unit 112 performs a process regarding generation of the prediction point. For example, the prediction point generation unit 112 obtains the geometry data and the information regarding the reference point supplied from the reference point setting unit 111. Furthermore, the prediction point generation unit 112 predicts the position of the point to be processed based on the position of the reference point on the basis of the obtained information, and generates the prediction point. The prediction point generation is described later in detail. The prediction point generation unit 112 supplies information regarding the generated prediction point and the geometry data to the difference derivation unit 113.

The difference derivation unit 113 performs a process regarding derivation of the difference in position information between the point to be processed and the prediction point. For example, the difference derivation unit 113 obtains the information regarding the prediction point and the geometry data supplied from the prediction point generation unit 112. Furthermore, the difference derivation unit 113 derives the difference between the position of the point to be processed and the position of the prediction point described above on the basis of the obtained information. The difference derivation unit 113 supplies the derived difference to the difference quantization unit 114.

The difference quantization unit 114 performs a process regarding quantization of the difference. For example, the difference quantization unit 114 obtains the difference supplied from the difference derivation unit 113. Furthermore, the difference quantization unit 114 quantizes the obtained difference by a predetermined method. The quantization is described later in detail. The difference quantization unit 114 supplies the quantized difference to the lossless encoding unit 102.

The lossless encoding unit 102 performs a process regarding encoding of the difference between the position of the point to be processed and the position of the prediction point. For example, the lossless encoding unit 102 obtains the difference supplied from the prediction processing unit 101 (the quantized difference supplied from the difference quantization unit 114). The lossless encoding unit 102 encodes the difference to generate encoded data. This encoding method is arbitrary as long as this is a lossless method. The lossless encoding unit 102 outputs the generated encoded data to the outside of the prediction encoding device 100.

As described above, the prediction encoding device 100 derives the difference between the position of the point to be processed and the position of the prediction point. In this derived difference, the position of the point to be processed is represented as the difference from the prediction point. Therefore, when prediction accuracy is sufficiently high, the prediction encoding device 100 may derive the difference having a smaller information amount than that of the point to be processed.

That is, the prediction encoding device 100 may perform encoding while reducing an information amount of the geometry data. Therefore, the prediction encoding device 100 may suppress the reduction in encoding efficiency of the point cloud data.

In this manner, in a case of the geometry data of the point cloud, the information amount may be reduced not by prediction of a pixel value as in a case of a two-dimensional image but by the prediction of the position of the point.

Note that each of these processing units (the prediction processing unit 101 (the reference point setting unit 111 to the difference quantization unit 114) and the lossless encoding unit 102) of the prediction encoding device 100 has an arbitrary configuration. For example, each processing unit may be configured by a logic circuit that realizes the above-described processes. Furthermore, it is also possible that each processing unit includes a central processing unit (CPU), a read only memory (ROM), a random access memory (RAM) and the like, for example, and executes a program by using them to realize the above-described processes. Of course, it is also possible that each processing unit has both configurations such that some of the above-described processes may be realized by the logic circuit and the others may be realized by execution of the program. The configurations of the respective processing units may be independent from each other, and for example, some processing units may realize some of the above-described processes by the logic circuit, some other processing units may realize the above-described processes by executing the program, and still other processing units may realize the above-described processes by both the logic circuit and the execution of the program.

<Flow of Prediction Encoding Process>

The prediction encoding device 100 executes a prediction encoding process to encode the geometry data. An example of a flow of the prediction encoding process executed by the prediction encoding device 100 is described with reference to a flowchart in FIG. 4.

When the prediction encoding process is started, at step S101, the prediction processing unit 101 of the prediction encoding device 100 performs a prediction process and derives the difference (quantized difference) between the position of the point to be processed and the position of the prediction point.

At step S102, the lossless encoding unit 102 performs lossless encoding on the difference (quantized difference) derived at step S101 by a predetermined encoding method.

When the process at step S102 is finished, the prediction encoding process is finished. By performing the above-described process on each point to be processed, the prediction encoding device 100 may suppress the reduction in encoding efficiency of the point cloud data.

<Flow of Prediction Process>

Figure 4:
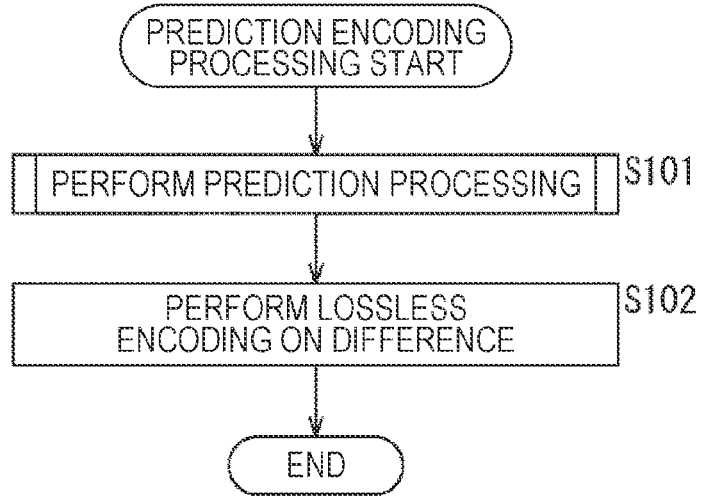
FIG. 4 is a flowchart for illustrating an example of a flow of a prediction encoding process.
Figure 5:
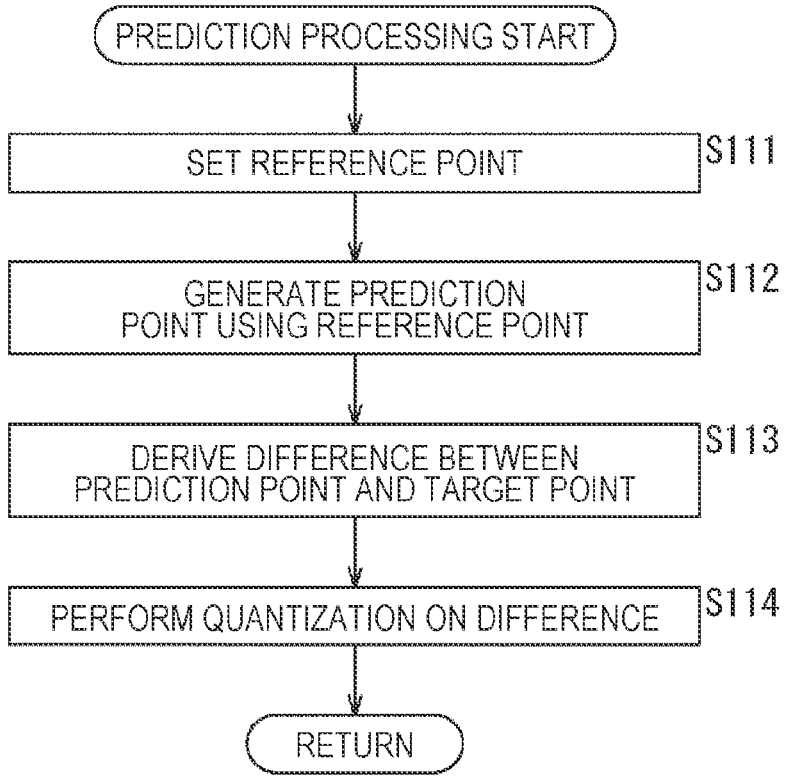
FIG. 5 is a flowchart for illustrating an example of a flow of a prediction process.

An example of a flow of the prediction process executed at step S101 in FIG. 4 is described with reference to a flowchart in FIG. 5.

When the prediction process is started, the reference point setting unit 111 of the prediction processing unit 101 sets the reference point corresponding to the point to be processed for the geometry data of the point cloud at step S111.

At step S112, the prediction point generation unit 112 predicts the position of the point to be processed using the position of the reference point set at step S111, and generates the prediction point corresponding to the point to be processed.

At step S113, the difference derivation unit 113 derives the difference between the position of the point to be processed and the position of the prediction poiht corresponding to the point to be processed generated at step S112.

At step S114, the difference quantization unit 114 quantizes the difference derived at step S113 by a predetermined method.

When the process at step S114 is finished, the prediction process is finished, and the procedure returns to FIG. 4.

By executing the prediction process as described above, the prediction processing unit 101 may reduce the information amount of the geometry data.

<Prediction Decoding Device>

Furthermore, for example, it is possible to decode the encoded data encoded using the prediction of the position information of the point to be processed of the point cloud representing the object having the three-dimensional shape as the point group, generate a difference between the position information of the prediction point predicted on the basis of the position information of the reference point and the position information of the point to be processed corresponding to the prediction point, predict the position information of the point to be processed on the basis of the position information of the reference point for the point cloud, generate the position information of the prediction point, add the generated position information of the prediction point to the generated difference, and derive the position information of the point to be processed.

For example, an information processing device may be provided with a decoding unit that decodes encoded data encoded using prediction of position information of a point to be processed of a point cloud that represents an object having a three-dimensional shape as a point group, and generates a difference between position information of a prediction point predicted on the basis of position information of a reference point and the position information of the point to be processed corresponding to the prediction point, a prediction unit that predicts the position information of the point to be processed on the basis of the position information of the reference point and generates the position information of the prediction point for the point cloud, and an addition unit that adds the position information of the prediction point generated by the prediction unit to the difference generated by the decoding unit and derives the position information of the point to be processed.

By decoding the encoded data obtained by encoding the difference in this manner, it is possible to realize suppression of the reduction in encoding efficiency of the point cloud data.

Figure 6:
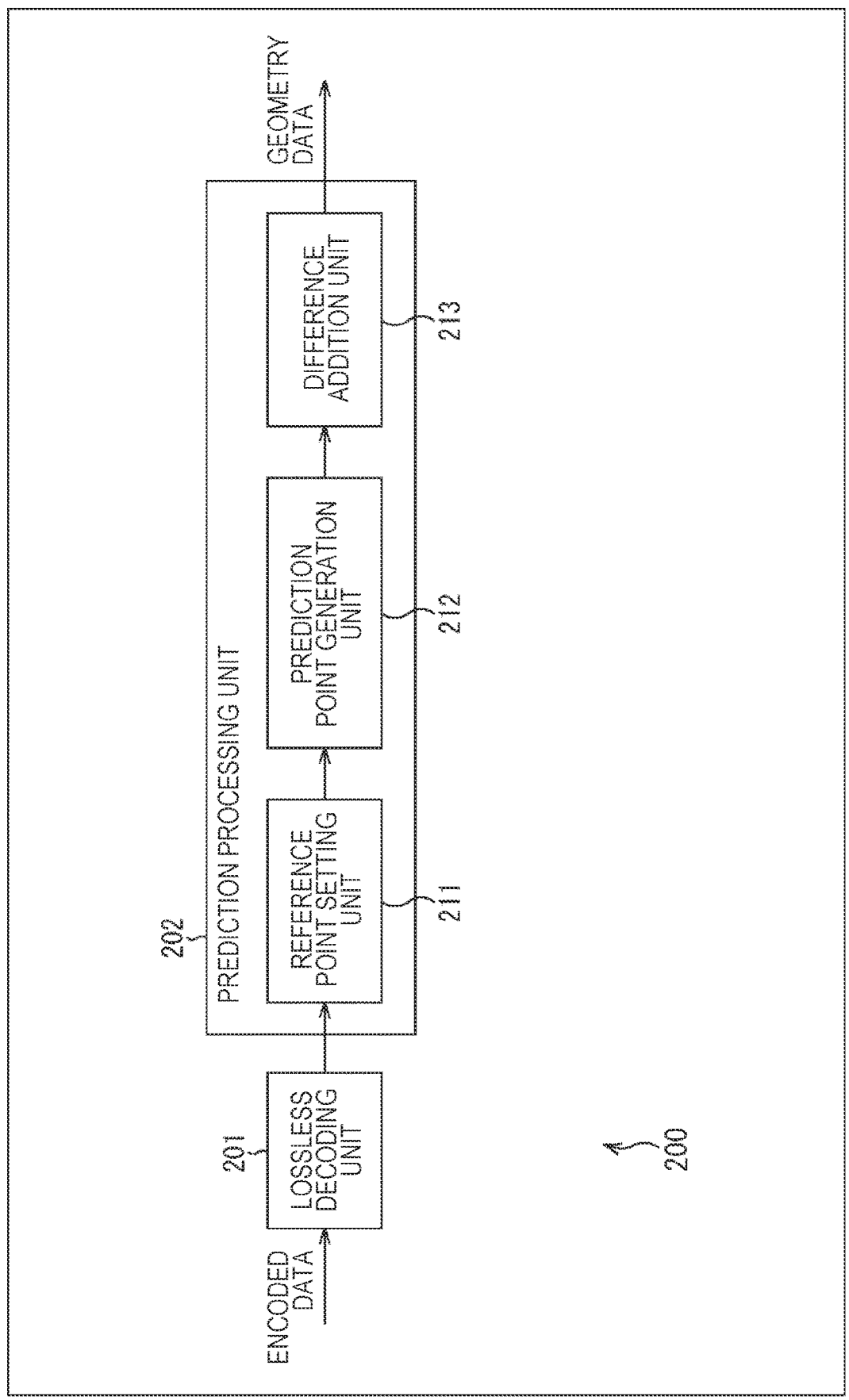
FIG. 6 is a block diagram illustrating a principal configuration example of a prediction decoding device.

A more specific example is described. FIG. 6 is a block diagram illustrating an example of a configuration of the prediction encoding device as an aspect of the information processing device to which the present technology is applied. A prediction decoding device 200 illustrated in FIG. 6 is a device that decodes the encoded data generated by, for example, the prediction encoding device 100 (that is, the encoded data of the geometry data encoded using the prediction), and generates the geometry data of the point cloud.

Note that, in FIG. 6, principal ones among processing units, data flows and the like are illustrated, and not all of them are illustrated in FIG. 6. That is, in the prediction encoding device 100, there may be a processing unit not illustrated as a block in FIG. 6, or there may be a process or a data flow not illustrated as an arrow and the like in FIG. 6.

As illustrated in FIG. 6, the prediction decoding device 200 includes a lossless decoding unit 201 and a prediction processing unit 202.

The lossless decoding unit 201 performs a process regarding decoding of the encoded data. For example, the lossless decoding unit 201 obtains the encoded data. This encoded data is obtained by encoding the geometry data of the point cloud using the prediction as described above. That is, the encoded data is generated by encoding the difference (quantized difference) between the position of the point to be processed and the position of the prediction point corresponding to the point to be processed. This encoded data is generated by the above-described prediction encoding device 100, for example.

The lossless decoding unit 201 decodes the encoded data and generates (restores) the difference between the position of the point to be processed and the position of the prediction point. This decoding method is arbitrary as long as this is a method corresponding to the encoding method performed by the prediction encoding device 100 described above. The lossless decoding unit 201 supplies the generated difference to the prediction processing unit 202.

The prediction processing unit 202 performs a process regarding prediction of the point to be processed. For example, the prediction processing unit 202 obtains the difference supplied from the lossless decoding unit 201. The prediction processing unit 202 predicts the point to be processed using the difference to generate the prediction point, and generates (restores) the geometry data using the prediction point and the difference. It may be said that this difference represents the position of the point to be processed by a relative position based on the position of the prediction point. That is, this difference may also be said to be the geometry data. Therefore, the prediction processing unit 202 may predict the point to be processed as in the case of the prediction encoding device 100.

The prediction processing unit 202 outputs the generated geometry data to the outside of the prediction decoding device 200.

The prediction processing unit 202 is provided with a reference point setting unit 211, a prediction point generation unit 212, and a difference addition unit 213.

The reference point setting unit 211 performs a process regarding setting of the reference point. For example, the reference point setting unit 211 obtains the difference supplied from the outside of the prediction processing unit 202. The reference point setting unit 211 uses the difference to set the reference point corresponding to the point to be processed. This difference may be said to be the geometry data (the position of the point to be processed represented by the relative position based on the position of the prediction point) as described above. Therefore, the reference point setting unit 211 may set the reference point for each point to be processed by a method similar to that in the case of the reference point setting unit 111. The reference point setting unit 211 supplies the difference and the information regarding the set reference point to the prediction point generation unit 212.

The prediction point generation unit 212 performs a process regarding generation of the prediction point. For example, the prediction point generation unit 212 obtains the difference and the information regarding the reference point supplied from the reference point setting unit 211. Furthermore, the prediction point generation unit 212 predicts the point to be processed using the set reference point on the basis of the obtained information, and generates the prediction point. The prediction point generation is described later in detail. The prediction point generation unit 212 supplies the difference and information regarding the generated prediction point to the difference addition unit 213.

The difference addition unit 213 performs a process regarding generation of the geometry data. For example, the difference addition unit 213 obtains the difference and the information regarding the prediction point supplied from the prediction point generation unit 212. Furthermore, the difference addition unit 213 adds the position of the prediction point indicated by the obtained information regarding the prediction point to the obtained difference to generate (restore) the geometry data. The difference addition unit 213 outputs the generated geometry data to the outside of the prediction decoding device 200.

By doing so, the prediction decoding device 200 may correctly decode the encoded data obtained by encoding the difference between the position of the point to be processed and the position of the prediction point, and restore the geometry data. That is, the prediction decoding device 200 may suppress the reduction in encoding efficiency of the point cloud data.

Note that each of these processing units (the lossless decoding unit 201 and the prediction processing unit 202 (the reference point setting unit 211 to the difference addition unit 213) of the prediction decoding device 200 has an arbitrary configuration. For example, each processing unit may be configured by a logic circuit that realizes the above-described processes. Furthermore, it is also possible that each processing unit includes, for example, a CPU, a ROM, a RAM and the like, and executes a program using them, thereby implementing the above-described processing. Of course, it is also possible that each processing unit has both configurations such that some of the above-described processes may be realized by the logic circuit and the others may be realized by execution of the program. The configurations of the respective processing units may be independent from each other, and for example, some processing units may realize some of the above-described processes by the logic circuit, some other processing units may realize the above-described processes by executing the program, and still other processing units may realize the above-described processes by both the logic circuit and the execution of the program.

<Flow of Prediction Decoding Process>

The prediction decoding device 200 executes a prediction decoding process to decode the encoded data. An example of a flow of the prediction encoding process executed by the prediction decoding device 200 is described with reference to a flowchart in FIG. 7.

When the prediction decoding process is started, at step S201, the lossless decoding unit 201 of the prediction decoding device 200 decodes the encoded data of the point to be processed by a predetermined decoding method (the decoding method corresponding to the encoding method at step S102 (FIG. 4)), and generates (restores) the difference between the position of the point to be processed and the position of the prediction point.

At step S202, the prediction processing unit 202 performs the prediction process to generate the prediction point corresponding to the point to be processed, adds the position of the generated prediction point to the difference generated at step S201, and generates (restores) the geometry data of the point to be processed.

When the process at step S202 is finished, the prediction decoding process is finished. By performing the processes as described above on each point to be processed, the prediction decoding device 200 may correctly decode the encoded data of the point cloud encoded using the prediction. That is, the prediction decoding device 200 may realize the suppression of the reduction in encoding efficiency of the point cloud data.

<Flow of Prediction Process>

An example of a flow of the prediction process executed at step S202 in FIG. 7 is described with reference to a flowchart in FIG. 8.

When the prediction process is started, the reference point setting unit 211 of the prediction processing unit 202 sets the reference point corresponding to the point to be processed on the basis of the difference between the position of the point to be processed and the position of the prediction point at step S211. The reference point setting unit 211 sets this reference point in a manner similar to that in the process at step S111 (FIG. 5).

At step S212, the prediction point generation unit 212 predicts the position of the point to be processed using the position of the reference point set at step S211, and generates the prediction point corresponding to the point to be processed.

At step S213, the difference addition unit 213 adds the prediction point derived at step S212 to the difference between the position of the point to be processed and the position of the prediction point. Therefore, the geometry data of the point to be processed is generated (restored).

When the process at step S213 is finished, the prediction process is finished, and the procedure returns to FIG. 7.

By executing the prediction process as described above, the prediction processing unit 202 may correctly restore the geometry data.

3. Second Embodiment

<Mode Selection>

The encoding/decoding method using the prediction (also referred to as prediction mode) described in the first embodiment may be used in combination with other encoding/decoding methods. In that case, it is possible to select which method is to be applied.

That is, as in a "method 2" illustrated in a top stage of a table in FIG. 9, it is possible to perform mode determination and select which encoding/decoding method is applied. By doing so, for example, a combination of a plurality of modes such as a combination of the prediction mode and a DCM may be realized. By supporting a plurality of encoding/decoding methods (modes) in this manner, it is possible to more appropriately perform encoding/decoding on more various data. For example, it is possible to suppress a reduction in encoding efficiency for more various data.

Note that, in this case, it is required to select the encoding method and the decoding method so that they correspond to each other. For this purpose, for example, as in a "method 2-1" in a second stage from the top of the table in FIG. 9, it is possible to perform the mode determination at the time of encoding, and transmit mode information indicating the applied method from an encoding side to a decoding side. In this case, the decoding method is selected according to the mode information. By doing so, it is possible to more easily apply the decoding method corresponding to the applied encoding method. Therefore, it is possible to suppress an increase in load of a decoding process (typically, reduce the load of the decoding process).

Furthermore, in this case, a method of the mode determination on the encoding side (method of selecting the encoding method) is arbitrary. For example, as in a "method 2-1-1" in a third stage from the top of the table in FIG. 9, it is possible to perform encoding while applying each encoding method prepared in advance as a candidate, evaluate each encoded result using a rate distortion (RD) cost, and select an optimal encoding method (at a lowest cost, for example). By doing so, it is possible to apply the optimal encoding method among the candidates to a point cloud to be processed. Therefore, it is possible to supply a reduction in encoding efficiency.

Furthermore, a method of selecting the encoding method and the decoding method so that they correspond to each other (method of the mode determination) is arbitrary, and is not limited to the "method 2-1" described above. For example, it is possible to perform common mode determination as in a "method 2-2" in a fourth stage from the top of the table in FIG. 9. That is, it is possible to perform similar mode determination both at the time of encoding and at the time of decoding, and select the same method (the encoding/decoding methods corresponding to each other). By doing so, transmission of the mode information may be omitted, so that the reduction in encoding efficiency may be suppressed.

The method of the mode determination in this case is arbitrary. For example, the prediction mode may be always applied as in a "method 2-2-1" in a fifth stage from the top of the table in FIG. 9. That is, in this case, the mode determination is omitted, and another mode such as the DCM is not used in combination. By doing so, a process of the mode determination is not required, so that an increase in load of the encoding process and the decoding process may be suppressed (typically, the load may be reduced).

Furthermore, for example, the mode may be selected according to a level (LoD) in an octree in which a node to be processed is located as in a "method 2-2-2" in a sixth stage from the top of the table in FIG. 9. For example, when the prediction mode or the DCM is applied to a node in a sparse state, the mode may be selected according to a depth of the level (LoD) of the node to be processed (the node determined to be in the sparse state).

Points in voxels corresponding to the node in the sparse state are estimated to be sparse. For example, as the node is determined to be sparse in a shallower level (upper layer), it is estimated that the points are sparse in a wider range of region. That is, it is estimated that there is a high possibility that a distance from the node to be processed to a peripheral point becomes longer. Therefore, when the prediction mode is applied, it is estimated that, the upper layer the node to be processed is located, the more significantly the prediction accuracy is reduced. That is, it is estimated that there is a high possibility that the encoding efficiency is reduced more significantly.

Conversely, as the node is determined to be sparse in a deeper level (lower layer), it is estimated that the points are sparse in a narrower range of region. That is, it is estimated that there is a high possibility that a distance from the node to be processed to a peripheral point becomes shorter. Therefore, when the prediction mode is applied, it is estimated that, the lower layer the node to be processed is located, the more significantly the prediction accuracy is improved. That is, it is estimated that there is a high possibility that the encoding efficiency is improved more significantly.

In this manner, it is possible to perform simple density determination by a depth of the level (LoD) of the node to be processed (the node determined to be in the sparse state). That is, by performing the mode selection according to the depth of the level of the node to be processed, it is possible to realize the mode selection according to a result of the simple density determination. For example, it is possible to apply the prediction mode to the node to be processed located in the lower layer (the node determined to be in the sparse state in the lower layer), and apply the DCM to the node to be processed located in the upper layer (the node determined to be in the sparse state in the upper layer). By doing so, it is possible to apply the mode in which a greater effect may be obtained to the node to be processed. For example, in a case of the above-described example, the prediction mode may be applied to the node with denser points and higher prediction accuracy. Therefore, the reduction in encoding efficiency may be further suppressed.

Furthermore, since the density determination in this case is a simple process based on the level (LoD), it is possible to suppress an increase in load of the encoding process and the decoding process due to the density determination.

Moreover, for example, as in a "method 2-2-3" in a seventh stage from the top of the table in FIG. 9, it is possible to confirm presence or absence of actual points (point distribution status) around the node to be processed, and select the mode on the basis of a confirmation result. That is, it is possible to determine an actual density state, and select a more appropriate mode (in which a greater effect may be obtained) on the basis of a determination result.

For example, it is possible to determine presence or absence of the point in a region within a predetermined distance from the node to be processed, and apply the prediction mode when the point is present and apply the DCM when the point is not present.

By performing the mode selection on the basis of the density determination in this manner, a more appropriate mode may be selected more accurately than in a case of the method 2-2-2 described above. Therefore, the reduction in encoding efficiency may be further suppressed.

Note that, although it is described that the method 2-2-2 and the method 2-2-3 are performed on both the encoding side and the decoding side, the present invention is not limited thereto, and it is possible that the mode determination is performed as in the method 2-2-2 and the method 2-2-3 on the encoding side and the mode information indicating the applied mode may be transmitted from the encoding side to the decoding side as in the method 2-1.

<Encoding Device>

Figure 10:
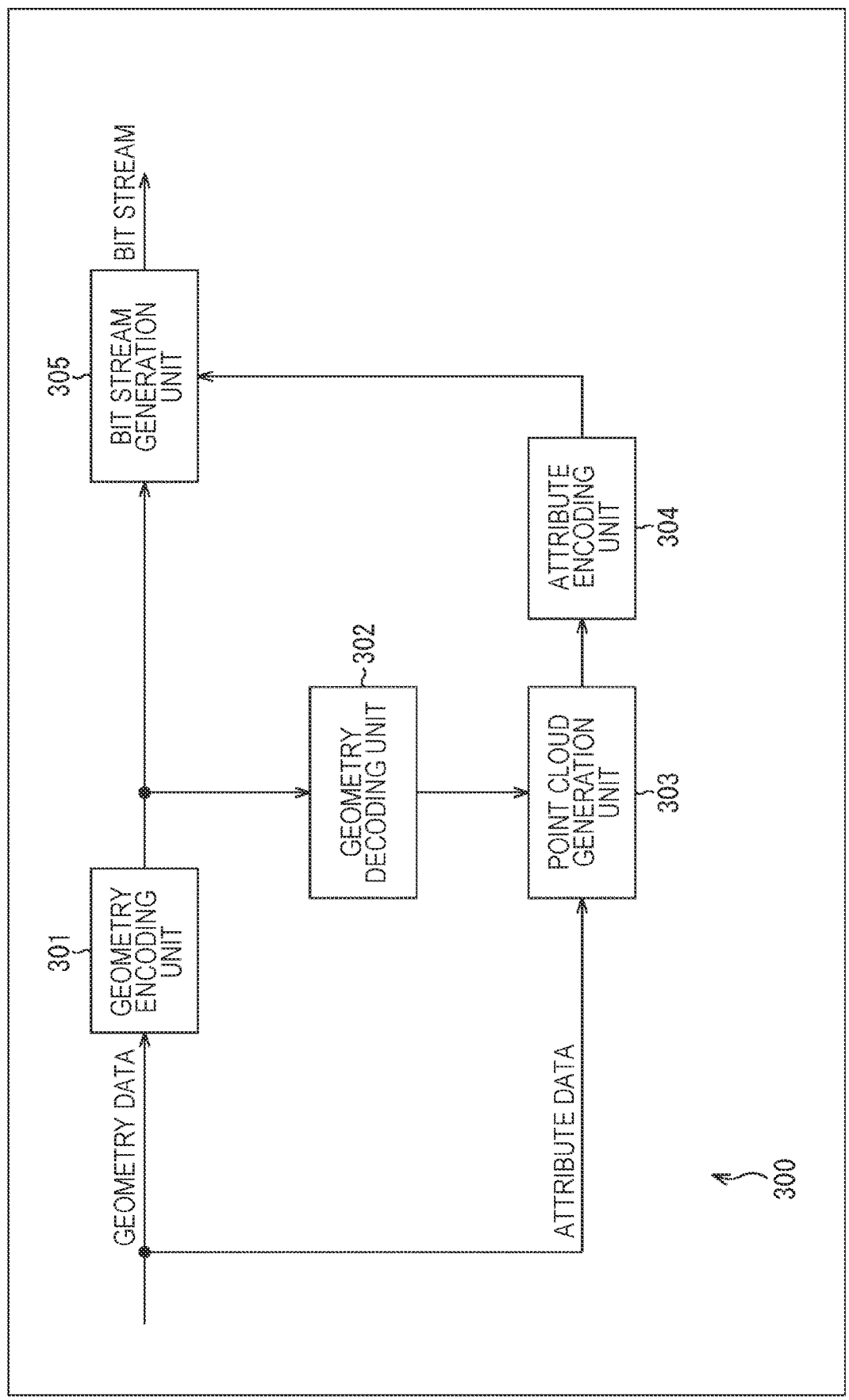
FIG. 10 is a block diagram illustrating a principal configuration example of an encoding device.

An example of applying such mode selection is described. FIG. 10 is a block diagram illustrating an example of a configuration of an encoding device, which is an aspect of an information processing device to which the present technology is applied. An encoding device 300 illustrated in FIG. 10 is a device that encodes 3D data such as a point cloud using a voxel and an octree.

Note that, in FIG. 10, principal ones among processing units, data flows and the like are illustrated, and not all of them are illustrated in FIG. 10. That is, in the encoding device 300, there may be a processing unit not illustrated as a block in FIG. 10, or there may be a process or a data flow not illustrated as an arrow and the like in FIG. 10. The same applies to other drawings illustrating a processing unit and the like in the encoding device 300.

As illustrated in FIG. 10, the encoding device 300 includes a geometry encoding unit 301, a geometry decoding unit 302, a point cloud generation unit 303, an attribute encoding unit 304, and a bitstream generation unit 305.

The geometry encoding unit 301 performs a process regarding encoding of geometry data. For example, the geometry encoding unit 301 obtains the geometry data of point cloud data input to the encoding device 300. The geometry encoding unit 301 encodes the geometry data to generate encoded data. The geometry encoding unit 301 supplies the generated encoded data to the geometry decoding unit 302 and the bitstream generation unit 305.

The geometry decoding unit 302 performs a process regarding decoding of the encoded data of the geometry data. For example, the geometry decoding unit 302 obtains the encoded data of the geometry data supplied from the geometry encoding unit 301. The geometry decoding unit 302 decodes the encoded data by a decoding method corresponding to an encoding method applied in the geometry encoding unit 301, and generates (restores) the geometry data. The decoding method is described later in detail using a decoding device as an example. The geometry decoding unit 302 supplies the generated geometry data to the point cloud generation unit 303.

The point cloud generation unit 303 performs a process regarding generation of the point cloud data. For example, the point cloud generation unit 303 obtains attribute data of the point cloud data input to the encoding device 300. Furthermore, the point cloud generation unit 303 obtains the geometry data supplied from the geometry decoding unit 302.

The geometry data might change due to the process such as encoding and decoding (for example, points might increase or decrease or move). That is, the geometry data supplied from the geometry decoding unit 302 might be different from the geometry data before being encoded by the geometry encoding unit 301.

Therefore, the point cloud generation unit 303 performs a process of matching the attribute data to the geometry data (decoding result) (also referred to as recolor process). That is, the point cloud generation unit 303 updates the attribute data so as to correspond to update of the geometry data. The point cloud generation unit 303 supplies the updated attribute data (attribute data corresponding to the geometry data (decoded result)) to the attribute encoding unit 304.

The attribute encoding unit 304 performs a process regarding encoding of the attribute. For example, the attribute encoding unit 304 obtains the attribute data supplied from the point cloud generation unit 303. Furthermore, the attribute encoding unit 304 encodes the attribute data by a predetermined method, and generates the encoded data of the attribute data. This encoding method is arbitrary. The attribute encoding unit 304 supplies the generated encoded data of the attribute data to the bitstream generation unit 305.

The bitstream generation unit 305 performs a process regarding generation of a bitstream. For example, the bitstream generation unit 305 obtains the geometry encoded data supplied from the geometry encoding unit 301. Furthermore, the bitstream generation unit 305 obtains the encoded data of the attribute data supplied from the attribute encoding unit 304. The bitstream generation unit 305 generates the bitstream including the encoded data. The bitstream generation unit 305 outputs the generated bitstream to the outside of the encoding device 300.

Note that each of these processing units (the geometry encoding unit 301 to the bitstream generation unit 305) of the encoding device 300 has an arbitrary configuration. For example, each processing unit may be configured by a logic circuit that realizes the above-described processes. Furthermore, it is also possible that each processing unit includes, for example, a CPU, a ROM, a RAM and the like, and executes a program using them, thereby implementing the above-described processing. Of course, it is also possible that each processing unit has both configurations such that some of the above-described processes may be realized by the logic circuit and the others may be realized by execution of the program. The configurations of the respective processing units may be independent from each other, and for example, some processing units may realize some of the above-described processes by the logic circuit, some other processing units may realize the above-described processes by executing the program, and still other processing units may realize the above-described processes by both the logic circuit and the execution of the program.

<Geometry Encoding Unit>

Figure 11:
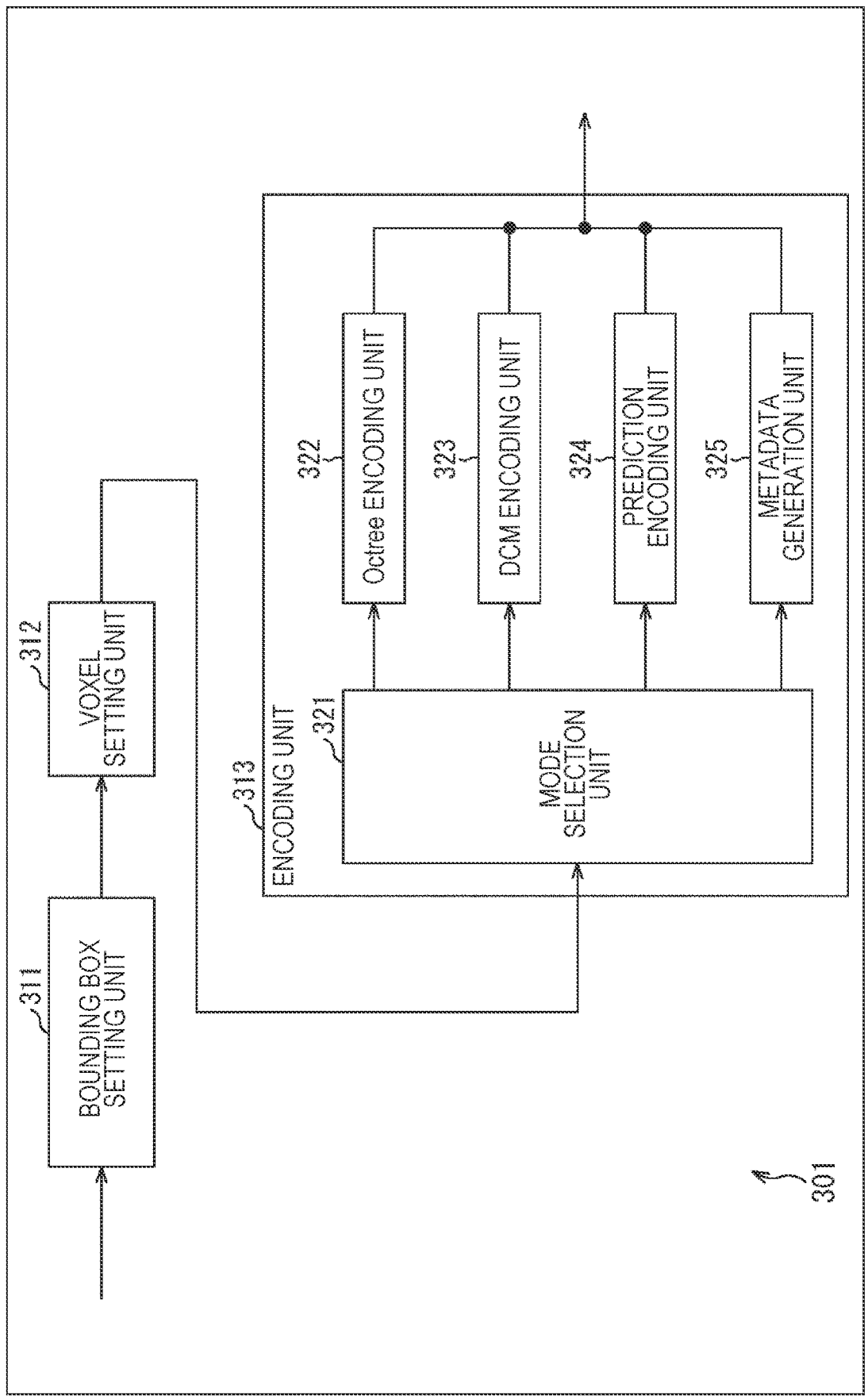
FIG. 11 is a block diagram illustrating a principal configuration example of a geometry encoding unit.

FIG. 11 is a block diagram illustrating a principal configuration example of the geometry encoding unit 301 (FIG. 10). As illustrated in FIG. 11, the geometry encoding unit 301 includes, for example, a bounding box setting unit 311, a voxel setting unit 312, and an encoding unit 313.

The bounding box setting unit 311 performs a process regarding setting of a bounding box. For example, the bounding box setting unit 311 obtains the geometry data of the point cloud data input to the encoding device 300. The bounding box setting unit 311 sets the bounding box for the geometry data. The bounding box is information for normalizing the geometry data to be encoded. Voxelization is performed with reference to the bounding box. The bounding box setting unit 311 supplies information regarding the bounding box to the voxel setting unit 312 together with the geometry data.

The voxel setting unit 312 performs a process regarding voxel setting. For example, the voxel setting unit 312 obtains the geometry data and the information regarding the bounding box supplied from the bounding box setting unit 311. Furthermore, the voxel setting unit 312 sets the voxels by dividing the bounding box set for the geometry data on the basis of these pieces of information. That is, the voxel setting unit 312 performs voxelization of the geometry data (quantization of a position of each point). The voxel setting unit 312 supplies the voxel data, which is the geometry data voxelized in this manner, to the encoding unit 313.

The encoding unit 313 performs a process regarding encoding of the voxel data. For example, the encoding unit 313 obtains the voxel data supplied from the voxel setting unit 312. Furthermore, the encoding unit 313 encodes the voxel data and generates the encoded data of the voxel data (that is, the encoded data of the geometry data). The encoding unit 313 supplies the encoded data to the geometry decoding unit 302 and the bitstream generation unit 305 (both in FIG. 10).

As illustrated in FIG. 11, the encoding unit 313 includes, for example, a mode selection unit 321, an octree encoding unit 322, a DCM encoding unit 323, a prediction encoding unit 324, and a metadata generation unit 325.

The mode selection unit 321 performs a process regarding selection of the encoding method (mode). For example, the mode selection unit 321 obtains the voxel data supplied from the voxel setting unit 312. Furthermore, the mode selection unit 321 selects the encoding method (mode) for each voxel (node in the octree). For example, the mode selection unit 321 selects whether to apply a method using the prediction of the position information of the point to be processed or to apply the DCM as the encoding method of the point to be processed.

A method of selecting the mode is arbitrary. For example, the mode selection unit 321 may select the mode on the basis of the RD cost as in the method 2-1-1 described above in <Mode Selection>. Furthermore, the mode selection unit 321 may always select the prediction mode (select the prediction mode for all the nodes) as in the method 2-2-1 described above in <Mode Selection>.

Moreover, the mode selection unit 321 may select the mode according to the depth of the level (LoD) of the node to be processed as in the method 2-2-2 described above in <Mode Selection>. That is, the decoding method of the point to be processed may be selected according to the level in which the node is sparse in a tree structure using the position information of each point forming the point cloud. The simple density determination may be performed on the basis of the depth of the level in which the node is sparse. That is, the decoding method of the point to be processed may be selected according to a result of the simple density determination.

Furthermore, the mode selection unit 321 may select the mode on the basis of presence or absence of points in a peripheral region of the node to be processed (actual density determination result) as in the method 2-2-3 described above in <Mode Selection>.

Furthermore, in the example in FIG. 11, three modes of the octree, the DCM, and the prediction mode are prepared as candidates, and the mode selection unit 321 selects one of these candidates. For example, when the octree is selected, the mode selection unit 321 supplies the voxel data of the voxel to be processed to the octree encoding unit 322. Furthermore, when the DCM is selected, the mode selection unit 321 supplies the voxel data of the voxel to be processed to the DCM encoding unit 323. Moreover, when the prediction mode is selected, the mode selection unit 321 supplies the voxel data of the voxel to be processed to the prediction encoding unit 324.

The octree encoding unit 322 performs a process regarding the encoding using the octree. For example, the octree encoding unit 322 obtains the voxel data of the voxel to be processed supplied from the mode selection unit 321. The octree encoding unit 322 generates octree data of the node to be processed by using the voxel data. The octree encoding unit 322 encodes the octree data of the node to be processed by a predetermined method to generate the encoded data. This encoding method is arbitrary as long as this is a lossless method. The octree encoding unit 322 supplies the generated encoded data (the encoded data of the voxel data of the node to be processed) to the geometry decoding unit 302 and the bitstream generation unit 305 (both in FIG. 10).

The DCM encoding unit 323 performs a process regarding the encoding using the DCM. For example, the DCM encoding unit 323 obtains the voxel data of the voxel to be processed supplied from the mode selection unit 321. The DCM encoding unit 323 encodes a relative distance from the node to be processed to a leaf by using the voxel data, and generates the encoded data. The DCM encoding unit 323 supplies the generated encoded data to the geometry decoding unit 302 and the bitstream generation unit 305 (both in FIG. 10).

The prediction encoding unit 324 has a configuration similar to that of the prediction encoding device 100 (FIG. 3) and performs a similar process. That is, the prediction encoding unit 324 performs a process regarding the encoding using the prediction (encoding in a prediction mode). For example, the prediction encoding unit 324 obtains the voxel data of the voxel to be processed supplied from the mode selection unit 321. The prediction encoding unit 324 performs the encoding using the prediction as described in <1. Encoding and Decoding Using Prediction> by using the voxel data. That is, the description made in <1. Encoding and Decoding Using Prediction> is also applicable to the prediction encoding unit 324.

That is, the prediction encoding unit 324 represents the position of the point to be processed as a difference (relative position) from the prediction point by this encoding, encodes the difference, and generates the encoded data. Therefore, when the prediction accuracy is sufficiently high, the prediction encoding unit 324 may suppress the reduction in encoding efficiency (typically, improve the encoding efficiency).

The prediction encoding unit 324 supplies the generated encoded data of the difference to the geometry decoding unit 302 and the bitstream generation unit 305 (both in FIG. 10).

Of course, the encoding unit 313 may support an arbitrary mode (encoding method). That is, the encoding unit 313 may support modes other than the octree, the DCM, and the prediction mode. When the encoding unit 313 is allowed to support other encoding methods, it is sufficient that the encoding unit 313 includes a processing unit supporting the encoding method, and the voxel data of the voxel to be processed is supplied to the processing unit when the mode selection unit 321 applies the encoding method.

Furthermore, in the example in FIG. 11, as in the method 2-1 described above in <Mode Selection>, the mode information indicating the mode selected by the mode selection unit 321 is included in, for example, the bitstream and transmitted to the decoding side. The mode selection unit 321 supplies the mode information indicating the selected mode to the metadata generation unit 325.

The metadata generation unit 325 performs a process regarding generation of metadata to be added to (or associated with) the encoded data of the geometry data. For example, the metadata generation unit 325 obtains the mode information supplied from the mode selection unit 321. The metadata generation unit 325 generates the metadata including the mode information. The metadata generation unit 325 supplies the metadata to the geometry decoding unit 302 and the bitstream generation unit 305 (both in FIG. 10) as the metadata of the encoded data generated in any of the octree encoding unit 322 to the prediction encoding unit 324 (for example, by adding or associating the same to or with the encoded data).

Note that, as in the method 2-2 described above in <Mode Selection>, it is also possible that the mode information is not transmitted, and the mode selection is performed (that is, the decoding method corresponding to the encoding method selected by the mode selection unit 321 is selected) also on the decoding side by a method similar to that in the mode selection by the mode selection unit 321.

In a case of a two-dimensional image, a pixel value is always present according to a pixel array, but the number of points of the point cloud and the position of each point depend on a three-dimensional structure represented by the point cloud. That is, the data structure of the point cloud is different for each data. Therefore, the optimal mode (encoding/decoding method) varies depending on data from the viewpoint of the encoding efficiency, processing load and the like. For example, the prediction accuracy of the prediction mode might change depending on a density state of the points.

Therefore, as described above, the mode selection unit 321 selects the mode to be applied on the basis of the geometry data to be encoded and the like, so that the encoding device 300 may more appropriately encode and decode more various data. For example, the encoding device 300 may adaptively allocate the mode such that the prediction mode is applied only to the node to be processed capable of obtaining sufficiently high prediction accuracy. That is, the encoding device 300 may suppress the reduction in encoding efficiency for more various data.

<Flow of Encoding Process>

The encoding device 300 encodes the geometry data by executing the encoding process. An example of a flow of the encoding process is described with reference to a flowchart in FIG. 12.

When the encoding process is started, at step S301, the geometry encoding unit 301 performs a geometry encoding process, encodes the geometry data, and generates the encoded data of the geometry data.

At step S302, the geometry decoding unit 302 decodes the encoded data generated at step S301, and generates (restores) the geometry data.

At step S303, the point cloud generation unit 303 performs the recolor process and allows the attribute data to correspond to the geometry data generated at step S302.

At step S304, the attribute encoding unit 304 encodes the attribute data subjected to the recolor process at step S303.

At step S305, the bitstream generation unit 305 generates the bitstream including the encoded data of the geometry data generated at step S301 and the encoded data of the attribute data generated at step S304.

When the process at step S305 is finished, the encoding process is finished.

<Flow of Geometry Encoding Process>

Figure 12:
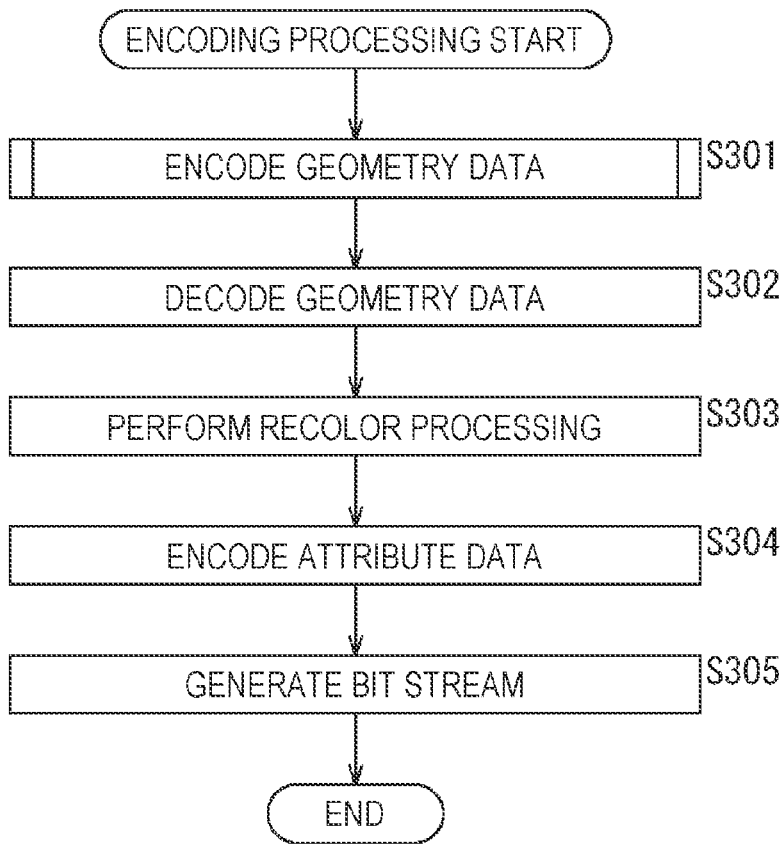
FIG. 12 is a flowchart for illustrating an example of a flow of an encoding process.

Next, an example of a flow of the geometry encoding process executed at step S301 in FIG. 12 is described with reference to a flowchart in FIG. 13.

When the geometry encoding process is started, the bounding box setting unit 311 of the geometry encoding unit 301 sets the bounding box for the geometry data at step S311.

At step S312, the voxel setting unit 312 divides the bounding box set at step S311 to set the voxels, and generates the voxel data.

At step S313, the encoding unit 313 executes a voxel data encoding process and encodes the voxel data.

When the process at step S313 is finished, the procedure returns to FIG. 12.

<Flow of Voxel Data Encoding Process>

Figure 13:
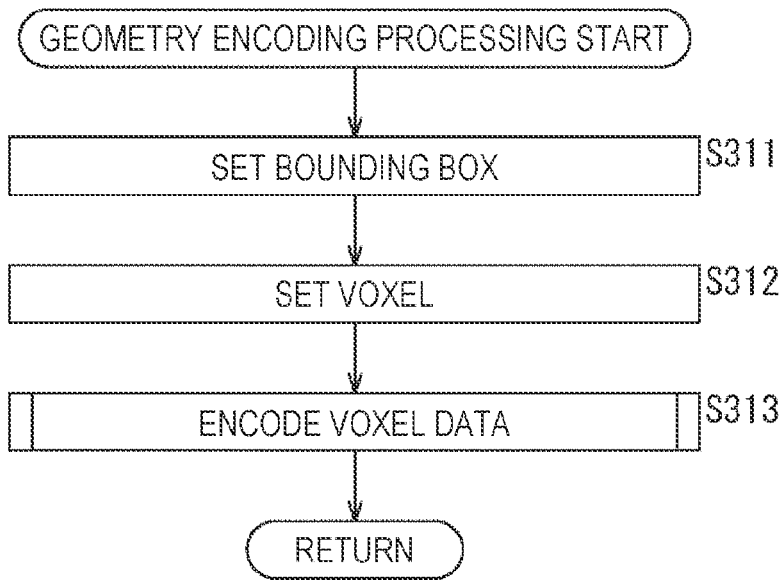
FIG. 13 is a flowchart for illustrating an example of a flow of a geometry encoding process.

Next, an example of a flow of the voxel data encoding process executed at step S313 in FIG. 13 is described with reference to a flowchart in FIG. 14.

When the voxel data encoding process is started, the mode selection unit 321 of the encoding unit 313 selects the voxel to be processed from the voxel data at step S321. For example, the mode selection unit 321 selects the voxels in order from the upper layer to the lower layer.

At step S322, the mode selection unit 321 determines whether or not the point corresponding to the voxel to be processed is a sparse point. For example, the mode selection unit 321 determines whether or not it is sparse depending on whether or not a predetermined condition is satisfied. This condition is arbitrary. For example, when the number of other nodes (also referred to as sibling nodes) directly belonging to a node (also referred to as a parent node) to which the node to be processed directly belongs is smaller than a predetermined threshold, the mode selection unit 321 may determine that the node to be processed is sparse. Furthermore, for example, when the number of nodes (also referred to as cousin nodes) directly belonging to a sibling node of the parent node of the node to be processed is smaller than a predetermined threshold, it may be determined that the node to be processed is sparse. It goes without saying that other conditions may be used.

When it is determined that the node to be processed is not sparse (dense), the procedure shifts to step S323. At step S323, the octree encoding unit 322 performs octree encoding. That is, the octree encoding unit 322 converts the voxel data of the voxel to be processed into the octree data, and encodes the same to generate the encoded data. When the process at step S323 is finished, the procedure shifts to step S334.

Furthermore, when it is determined at step S322 that the node to be processed is sparse (not dense), the procedure shifts to step S324.

At step S324, the mode selection unit 321 determines whether or not the number of leaves directly or indirectly belonging to the node to be processed is smaller than a threshold. When it is determined that the number of leaves is equal to or larger than the threshold, it is determined that the node to be processed is not sparse (dense), and the procedure shifts to step S325.

At step S325, the mode selection unit 321 turns a DCM flag off (OFF). The DCM flag is flag information indicating whether or not the DCM or the prediction mode is applied. Turning the DCM flag off indicates that the DCM or the prediction mode is not applied (the octree is applied). The metadata generation unit 325 includes the DCM flag in the metadata.

When the process at step S325 is finished, the procedure shifts to step S323. That is, the octree encoding is performed also in this case.

Furthermore, when it is determined at step S324 that the number of leaves is smaller than the threshold, the procedure shifts to step S326.

At step S326, the mode selection unit 321 turns the DCM flag on (ON). Turning the DCM flag on indicates that the DCM or the prediction mode is applied (the octree is not applied). The metadata generation unit 325 includes the DCM flag in the metadata.

At step S327, the mode selection unit 321 applies respective modes prepared as candidates, and evaluates encoding results of the respective modes using the RD cost to compare.

At step S329, the mode selection unit 321 determines whether or not the prediction mode is optimal on the basis of a comparison result. When it is determined that this is not optimal, the procedure shifts to step S330.

At step S330, the mode selection unit 321 turns a prediction flag off (OFF). The prediction flag is flag information (mode information) indicating whether or not the prediction mode is applied. Turning the prediction flag off indicates that the prediction mode is not applied (the DCM is applied). The metadata generation unit 325 includes the prediction flag in the metadata as the mode information.

At step S331, the DCM encoding unit 323 performs DCM encoding. That is, the DCM encoding unit 323 encodes the relative distance from the point (node) of the voxel to be processed to the leaf. When the process at step S331 is finished, the procedure shifts to step S334.

Furthermore, when it is determined that the prediction mode is optimal at step S329, the procedure shifts to step S332.

At step S332, the mode selection unit 321 turns the prediction flag on (ON). Turning the prediction flag on indicates that the prediction mode is applied (the DCM is not applied). The metadata generation unit 325 includes the prediction flag in the metadata as the mode information.

At step S333, the prediction encoding unit 324 performs a prediction encoding process. This prediction encoding process is performed in a flow similar to that when described with reference to the flowchart in FIG. 4. That is, the prediction encoding unit 324 predicts a position of the leaf belonging to the voxel (node) to be processed, and generates a prediction point. Furthermore, the prediction encoding unit 324 derives a difference between the point to be processed and the prediction point, and encodes the difference. When the process at step S333 is finished, the procedure shifts to step S334.

At step S334, the mode selection unit 321 determines whether or not all the points are processed. When it is determined that there is a point not yet processed, the procedure returns to step S321 and subsequent processes are repeated. That is, each process at steps S321 to S334 is executed for each voxel.

Then, when it is determined at step S334 that all the points are processed, the voxel data encoding process is finished.

By executing each process as described above, the encoding device 300 may suppress the reduction in encoding efficiency for more various data.

<Decoding Device>

Figure 15:
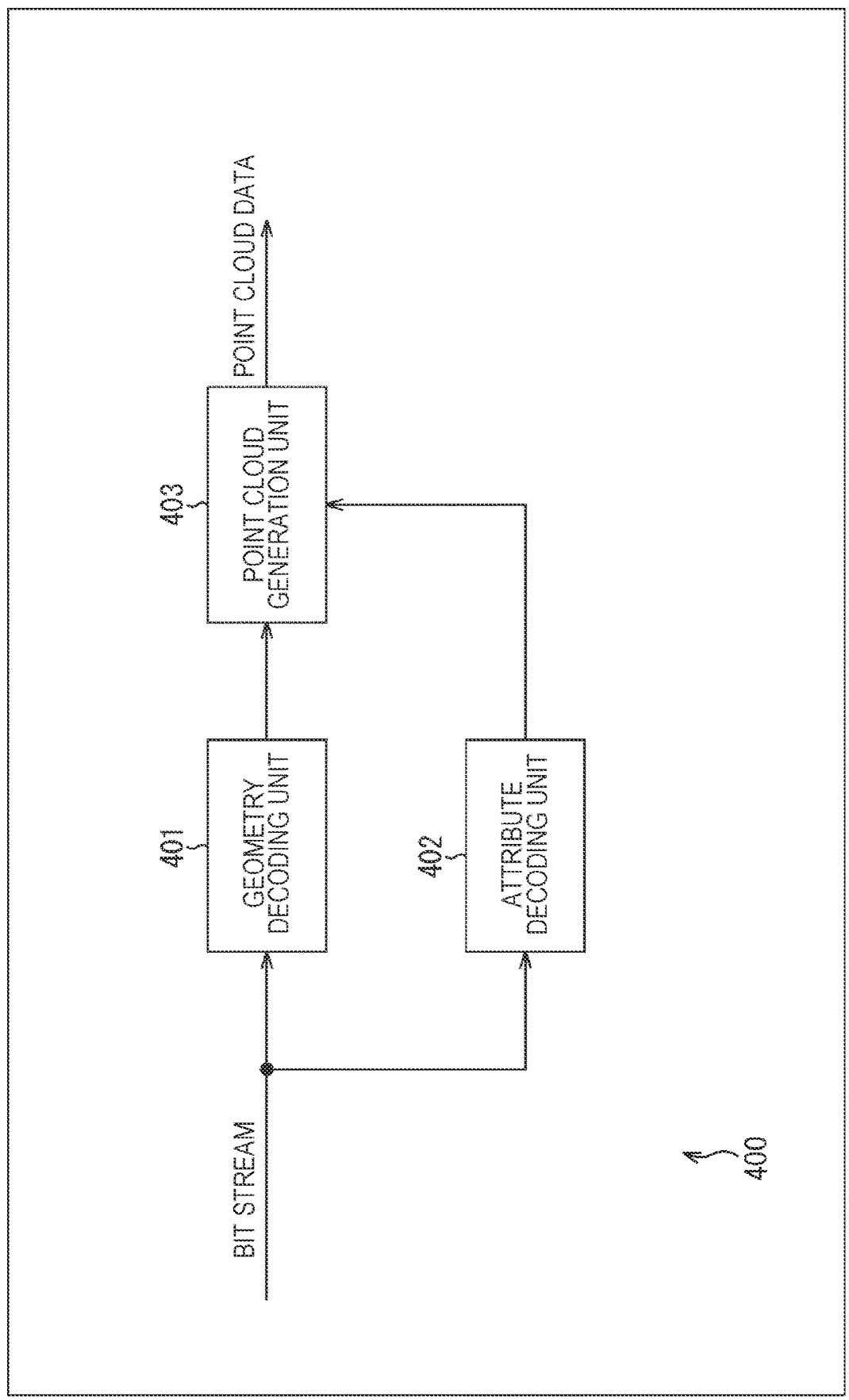
FIG. 15 is a block diagram illustrating a principal configuration example of a decoding device.

FIG. 15 is a block diagram illustrating an example of a configuration of a decoding device, which is an aspect of the information processing device to which the present technology is applied. A decoding device 400 illustrated in FIG. 15 is a device that decodes the encoded data obtained by encoding the 3D data such as the point cloud using the voxel and the octree. The decoding device 400 corresponds to, for example, the encoding device 300 (FIG. 10), and may correctly decode the encoded data generated by the encoding device 300.

Note that, in FIG. 15, principal ones among processing units, data flows and the like are illustrated, and not all of them are illustrated in FIG. 15. That is, in the decoding device 400, there may be a processing unit not illustrated as a block in FIG. 15, or there may be a process or a data flow not illustrated as an arrow and the like in FIG. 15. The same applies to other drawings illustrating a processing unit and the like in the decoding device 400.

As illustrated in FIG. 15, the decoding device 400 includes a geometry decoding unit 401, an attribute decoding unit 402, and a point cloud generation unit 403.

The geometry decoding unit 401 performs a process regarding decoding of the encoded data of the geometry data. For example, the geometry decoding unit 401 obtains the bitstream input to the decoding device 400. The geometry decoding unit 401 decodes the encoded data of the geometry data included in the bitstream to generate (restore) the geometry data.

The geometry decoding unit 401 performs this decoding by a decoding method corresponding to the encoding method applied by the geometry encoding unit 301 (FIG. 10). Note that the geometry decoding unit 302 (FIG. 10) has a configuration similar to that of the geometry decoding unit 401 and performs a similar process. That is, the description regarding the geometry decoding unit 401 is also applicable to the geometry decoding unit 302.

The geometry decoding unit 401 supplies the generated geometry data to the point cloud generation unit 403.

The attribute decoding unit 402 performs a process regarding decoding of the encoded data of the attribute data. For example, the attribute decoding unit 402 obtains the bitstream input to the decoding device 400. The attribute decoding unit 402 decodes the encoded data of the attribute data included in the bitstream, and generates (restores) the attribute data.

The attribute decoding unit 402 performs this decoding by a decoding method corresponding to the encoding method applied by the attribute encoding unit 304 (FIG. 10). The attribute decoding unit 402 supplies the generated attribute data to the point cloud generation unit 403.

The point cloud generation unit 403 performs a process regarding generation of the point cloud. For example, the point cloud generation unit 403 obtains the geometry data supplied from the geometry decoding unit 401. Furthermore, the point cloud generation unit 403 obtains the attribute data supplied from the attribute decoding unit 402. Then, the point cloud generation unit 403 allows the geometry data to correspond to the attribute data to generate the point cloud data. The point cloud generation unit 403 outputs the generated point cloud data to the outside of the decoding device 400.

Note that each of these processing units (the geometry decoding unit 401 to the point cloud generation unit 403) of the decoding device 400 has an arbitrary configuration. For example, each processing unit may be configured by a logic circuit that realizes the above-described processes. Furthermore, it is also possible that each processing unit includes, for example, a CPU, a ROM, a RAM and the like, and executes a program using them, thereby implementing the above-described processing. Of course, it is also possible that each processing unit has both configurations such that some of the above-described processes may be realized by the logic circuit and the others may be realized by execution of the program. The configurations of the respective processing units may be independent from each other, and for example, some processing units may realize some of the above-described processes by the logic circuit, some other processing units may realize the above-described processes by executing the program, and still other processing units may realize the above-described processes by both the logic circuit and the execution of the program.

<Geometry Decoding Unit>

Figure 16:
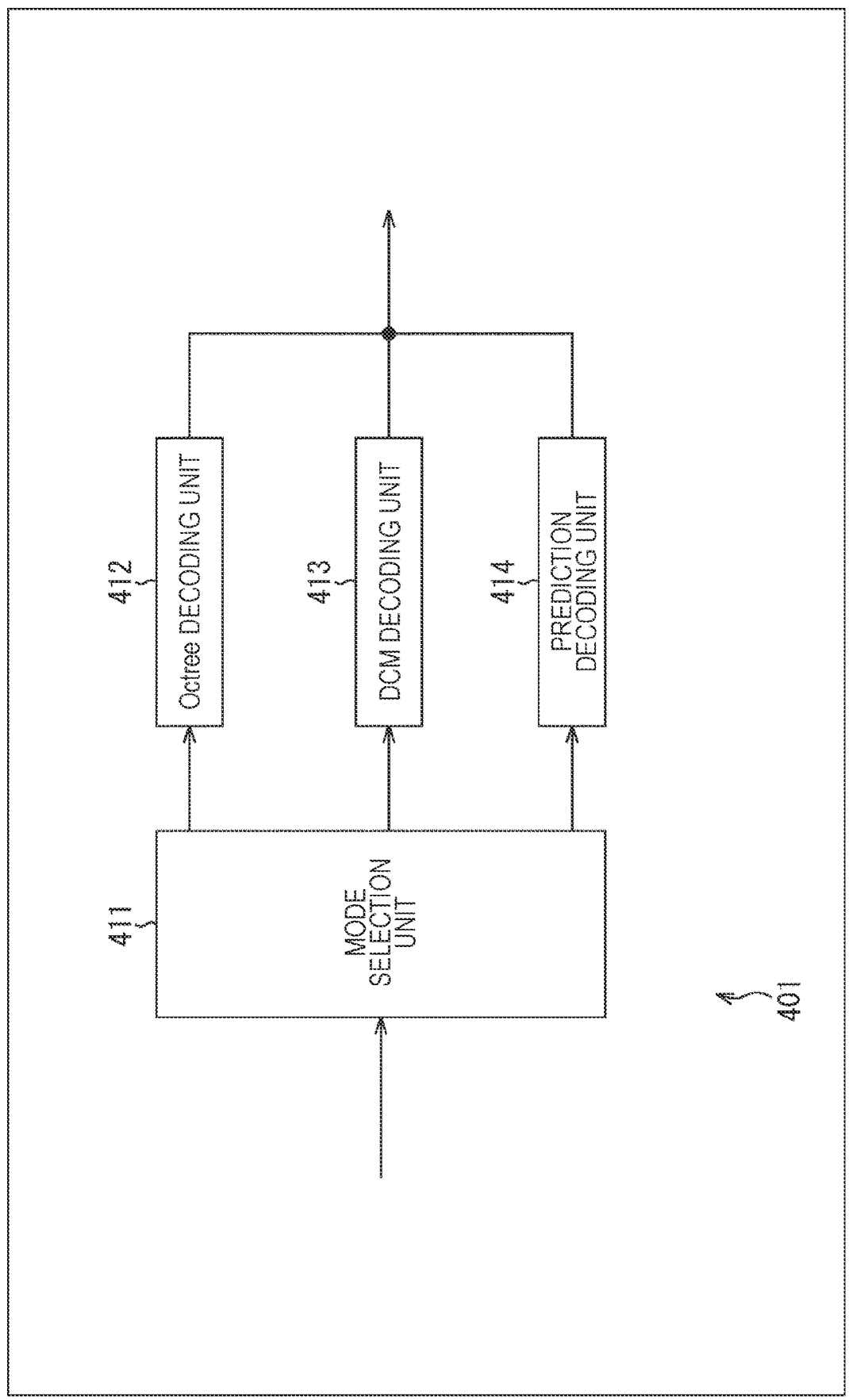
FIG. 16 is a block diagram illustrating a principal configuration example of a geometry decoding unit.

FIG. 16 is a block diagram illustrating a principal configuration example of the geometry decoding unit 401 (FIG. 15). As illustrated in FIG. 16, the geometry decoding unit 401 includes, for example, a mode selection unit 411, an octree decoding unit 412, a DCM decoding unit 413, and a prediction decoding unit 414.

The mode selection unit 411 performs a process regarding selection of the decoding method (mode). For example, the mode selection unit 411 obtains the bitstream input to the decoding device 400. Furthermore, the mode selection unit 411 selects the decoding method (mode) for each voxel (node in the octree) on the basis of the metadata (mode information) included in the bitstream.

That is, the mode selection unit 411 grasps the encoding method applied in the geometry encoding unit 301 by referring to the mode information, and selects the decoding method (mode) corresponding to the encoding method. For example, the mode selection unit 411 selects whether to apply a method of using the prediction of the position information of the point to be processed or to apply the DCM as the decoding method of the point to be processed.

Furthermore, in the example in FIG. 16, the three modes of the octree, the DCM, and the prediction mode are prepared as the candidates, and the mode selection unit 411 selects one of these candidates. For example, when the octree is selected, the mode selection unit 411 supplies the encoded data of the geometry data corresponding to the node to be processed to the octree decoding unit 412. Furthermore, when the DCM is selected, the mode selection unit 411 supplies the encoded data of the geometry data corresponding to the node to be processed to the DCM decoding unit 413. Moreover, when the prediction mode is selected, the mode selection unit 411 supplies the encoded data of the geometry data corresponding to the node to be processed to the prediction decoding unit 414.

The octree decoding unit 412 performs a process regarding the decoding using the octree. For example, the octree decoding unit 412 obtains the encoded data of the geometry data supplied from the mode selection unit 411. The octree decoding unit 412 decodes the encoded data to generate (restore) the geometry data corresponding to the node to be processed (the octree data of the node to be processed). This decoding method is arbitrary as long as this is a method corresponding to the encoding method applied in the octree encoding unit 322.

The octree decoding unit 412 converts the generated octree data into the geometry data including coordinate information of the node to be processed. The position of the node to be processed is quantized by voxelization. That is, the geometry data corresponds to the voxel data to be encoded by the octree encoding unit 322. The octree decoding unit 412 supplies the generated geometry data to the point cloud generation unit 403 (FIG. 15).

The DCM decoding unit 413 performs a process regarding the decoding using the DCM. For example, the DCM decoding unit 413 obtains the encoded data of the geometry data supplied from the mode selection unit 411. The DCM decoding unit 413 decodes the encoded data, and generates (restores) the geometry data of the node to be processed and the relative distance from the node to be processed to the leaf. This decoding method is arbitrary as long as this is a method corresponding to the encoding method applied in the DCM encoding unit 323.

The DCM decoding unit 413 generates (restores) the geometry data of the leaf on the basis of the generated information. The DCM decoding unit 413 supplies the generated geometry data to the point cloud generation unit 403 (FIG. 15).

The prediction decoding unit 414 performs a process regarding the decoding using the prediction (decoding in the prediction mode). The prediction decoding unit 414 has a configuration similar to that of the prediction decoding device 200 (FIG. 6) and performs a similar process. That is, the prediction decoding unit 414 performs the decoding using the prediction as described in <1. Encoding and Decoding Using Prediction>. That is, the description made in <1. Encoding and Decoding Using Prediction> is also applicable to the prediction decoding unit 414. Therefore, when the prediction accuracy is sufficiently high, the prediction decoding unit 414 may realize the suppression of the reduction in encoding efficiency (typically, this may improve the encoding efficiency).

For example, the prediction decoding unit 414 obtains the encoded data of the geometry data supplied from the mode selection unit 411. The prediction decoding unit 414 decodes the encoded data, and generates (restores) a difference regarding the leaf that directly or indirectly belongs to the node to be processed. This decoding method is arbitrary as long as this is a method corresponding to the encoding method applied in the prediction encoding unit 324.

The prediction decoding unit 414 performs the prediction as in the case with the prediction encoding unit 324, and generates the prediction point. Furthermore, the prediction decoding unit 414 adds a position of the prediction point to the difference (difference between the point to be processed and the prediction point) obtained by decoding to generate (restore) the geometry data of the point to be processed. The prediction decoding unit 414 supplies the generated geometry data to the point cloud generation unit 403 (FIG. 15).

As in the case with the encoding unit 313, the geometry decoding unit 401 may support an arbitrary mode (decoding method). That is, the geometry decoding unit 401 may support modes other than the octree, the DCM, and the prediction mode. When the geometry decoding unit 401 is allowed to correspond to another decoding method, it is sufficient that the geometry decoding unit 401 includes a processing unit supporting the decoding method, and the encoded data is supplied to the processing unit when the mode selection unit 411 applies the decoding method.

In this manner, the mode selection unit 411 selects the mode to be applied on the basis of the mode information and the like, so that the decoding device 400 may more easily apply the decoding method corresponding to the encoding method applied by the encoding device 300. Therefore, the decoding device 400 may more appropriately decode more various data. For example, the decoding device 400 may adaptively allocate a mode such that the prediction mode is applied only to the node to be processed capable of obtaining sufficiently high prediction accuracy. That is, the decoding device 400 may suppress the reduction in encoding efficiency for more various data.

<Flow of Decoding Process>

The decoding device 400 decodes the encoded data by executing a decoding process. An example of a flow of the decoding process is described with reference to a flowchart in FIG. 17.

When the decoding process is started, at step S401, the geometry decoding unit 401 performs a geometry decoding process, decodes the encoded data of the geometry data, and generates (restores) the geometry data.

At step S402, the attribute decoding unit 402 decodes the encoded data of the attribute data to generate (restore) the attribute data.

At step S403, the point cloud generation unit 403 generates the point cloud data by allowing the geometry data generated at step S401 to correspond to the attribute data generated at step S402.

When the process at step S403 is finished, the decoding process is finished.

<Flow of Geometry Decoding Process>

Figure 17:
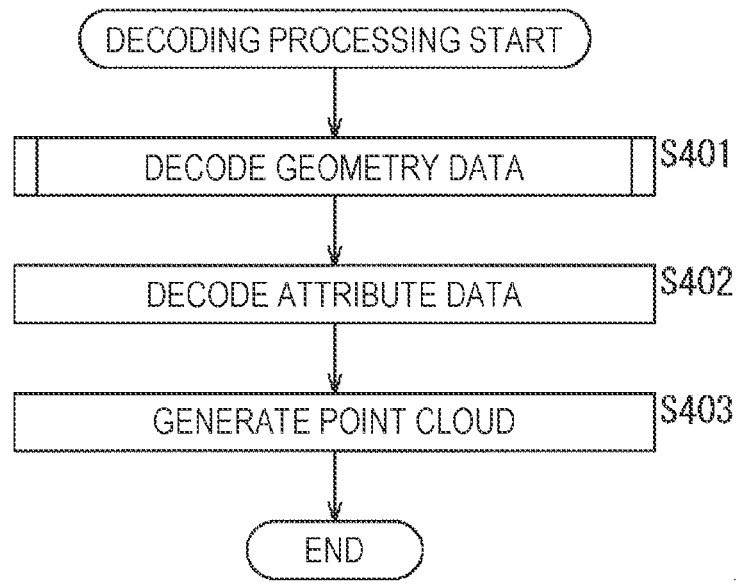
FIG. 17 is a flowchart for illustrating an example of a flow of a decoding process.

Next, an example of a flow of the geometry decoding process executed at step S401 in FIG. 17 is described with reference to a flowchart in FIG. 18.

When the geometry decoding process is started, the mode selection unit 411 selects a node to be processed at step S411. For example, the mode selection unit 411 selects nodes in order from an upper layer to a lower layer.

At step S412, the mode selection unit 411 determines whether or not the node to be processed is a sparse point. This determination method is similar to that in a case at step S322.

When it is determined that the node to be processed is not sparse (dense), the procedure shifts to step S413. At step S413, the octree decoding unit 412 performs octree decoding. That is, the octree decoding unit 412 decodes the encoded data to generate the octree data, and further generates the geometry data by using the octree data. When the process at step S413 is finished, the procedure shifts to step S418.

Furthermore, when it is determined at step S412 that the node to be processed is sparse (not dense), the procedure shifts to step S414.

At step S414, the mode selection unit 411 refers to the DCM flag of the metadata included in the bitstream, and determines whether or not the DCM flag is turned on (ON). When it is determined that the DCM flag is turned off (OFF), the octree encoding is applied, so that the procedure shifts to step S413.

Furthermore, when it is determined at step S414 that the DCM flag is turned on (ON), the DCM or the prediction mode is applied, so that the procedure shifts to step S415.

At step S415, the mode selection unit 411 refers to the prediction flag (mode information) of the metadata included in the bitstream, and determines whether or not the prediction flag is turned on (ON). When it is determined that the prediction flag is turned off (OFF), the DCM encoding is applied, so that the procedure shifts to step S416.

At step S416, the DCM decoding unit 413 performs DCM decoding. That is, the DCM decoding unit 413 decodes the encoded data, and generates (restores) the relative distance from the point (node) of the voxel to be processed to the leaf. When the process at step S416 is finished, the procedure shifts to step S418.

Furthermore, when it is determined at step S415 that the prediction flag is turned on (ON), the prediction encoding is applied, so that the procedure shifts to step S417.

At step S417, the prediction decoding unit 414 performs a prediction decoding process. This prediction decoding process is performed in a flow similar to that when described with reference to the flowchart in FIG. 7, for example. That is, the prediction decoding unit 414 decodes the encoded data, and generates (restores) a difference between the position of the point to be processed that is the leaf belonging to the voxel (node) to be processed and the position of the prediction point thereof. Furthermore, the prediction decoding unit 414 sets a reference point, performs prediction on the basis of the reference point, and generates the prediction point. Then, the prediction decoding unit 414 generates (restores) the geometry data of the point to be processed by adding the position of the prediction point to the difference. When the process at step S417 is finished, the procedure shifts to step S418.

At step S418, the mode selection unit 411 determines whether or not all the points are processed. When it is determined that there is a point not yet processed, the procedure returns to step S411 and subsequent processes are repeated. That is, each process at steps S411 to S418 is executed for each voxel.

Then, when it is determined at step S418 that all the points are processed, the geometry decoding process is finished.

By executing each process as described above, the decoding device 400 may suppress the reduction in encoding efficiency for more various data.

<Flow of Voxel Data Encoding Process>

In the above description, a case where the method 2-1 (FIG. 9) is applied and the prediction flag is transmitted as the mode information from the encoding device 300 to the decoding device 400 is described as an example, but the present invention is not limited thereto, and the method 2-2 (FIG. 9) may be applied. That is, it is possible that the encoding device 300 and the decoding device 400 perform the common mode determination and select whether or not to apply the prediction mode on the basis of a determination result instead of transmitting the mode information.

Figure 19:
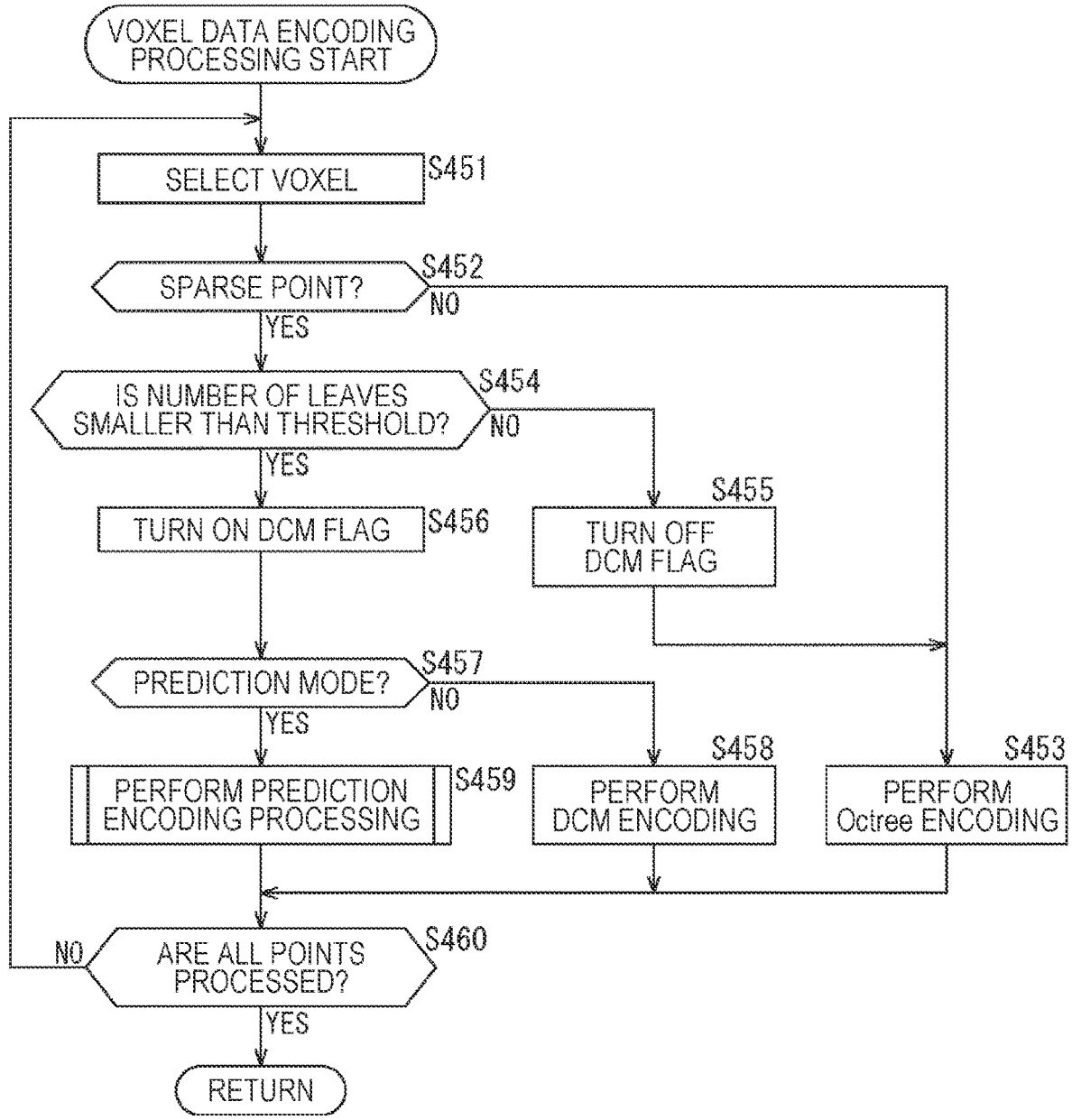
FIG. 19 is a flowchart for illustrating an example of a flow of a voxel data encoding process.

An example of a flow of the voxel data encoding process executed by the geometry encoding unit 301 of the encoding device 300 in this case is described with reference to a flowchart in FIG. 19.

Figure 14:
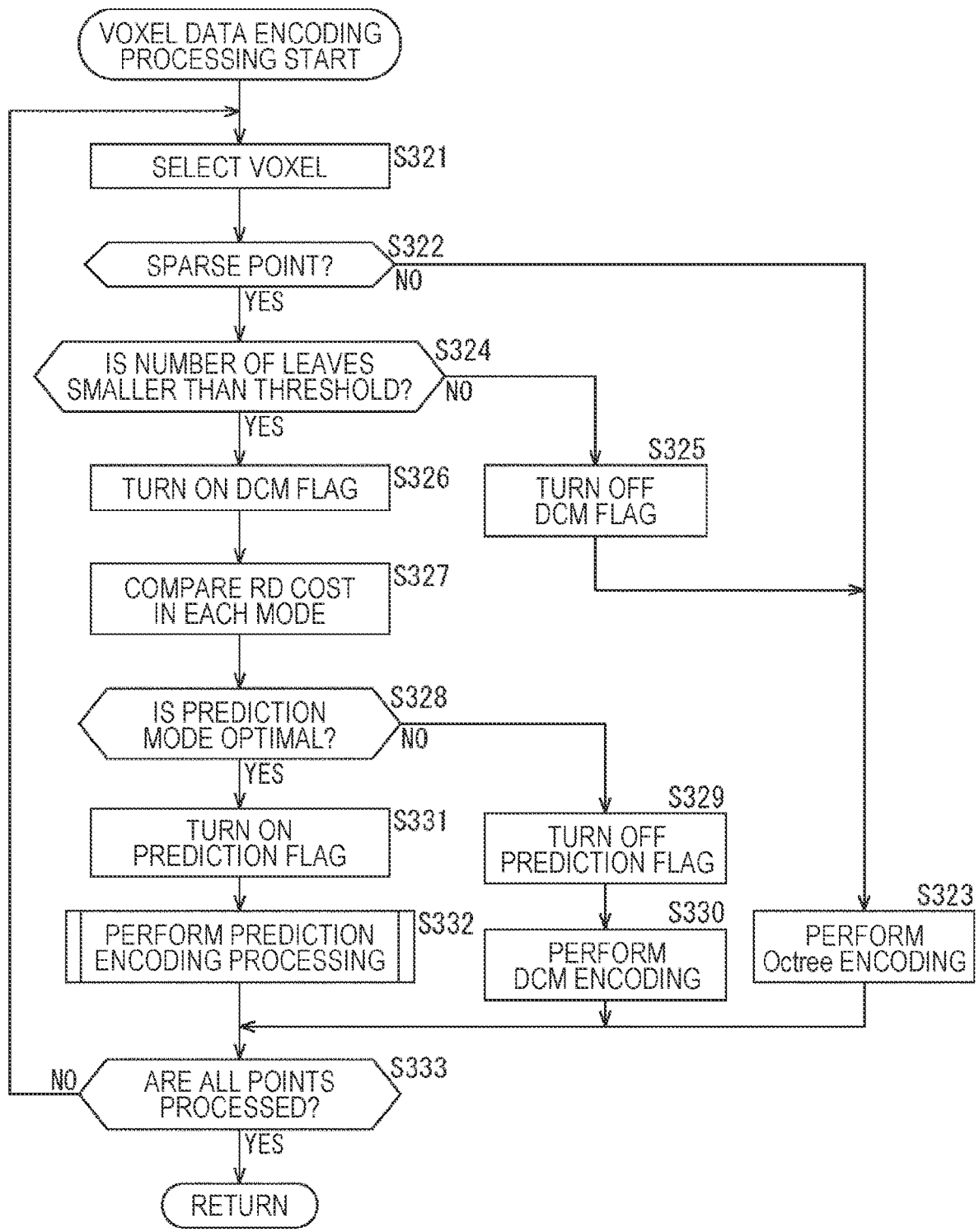
FIG. 14 is a flowchart for illustrating an example of a flow of a voxel data encoding process.

In this case also, respective processes at steps S451 to S456 are performed in a manner similar to that of the respective processes at steps S321 to S326 in FIG. 14.

At step S457, the mode selection unit 321 determines whether or not to apply the prediction mode. A determination method thereof is arbitrary. For example, any of the methods 2-2-1 to 2-2-3 described with reference to FIG. 9 may be applied. Furthermore, other determination methods may also be applied.

When it is determined at step S457 that the prediction mode is not applied, the procedure shifts to step S458. At step S458, the DCM encoding unit 323 performs the DCM encoding. Furthermore, when it is determined at step S457 that the prediction mode is applied, the procedure shifts to step S459. At step S459, the prediction encoding unit 324 performs the prediction encoding process. This prediction encoding process is performed in a flow similar to the case described with reference to the flowchart in FIG. 4, for example.

A process at step S460 is performed in a manner similar to that of the process at step S334 in FIG. 14. When it is determined at step S460 that all the points are processed, the voxel data encoding process is finished, and the procedure returns to FIG. 13.

<Flow of Geometry Decoding Process>

Figure 20:
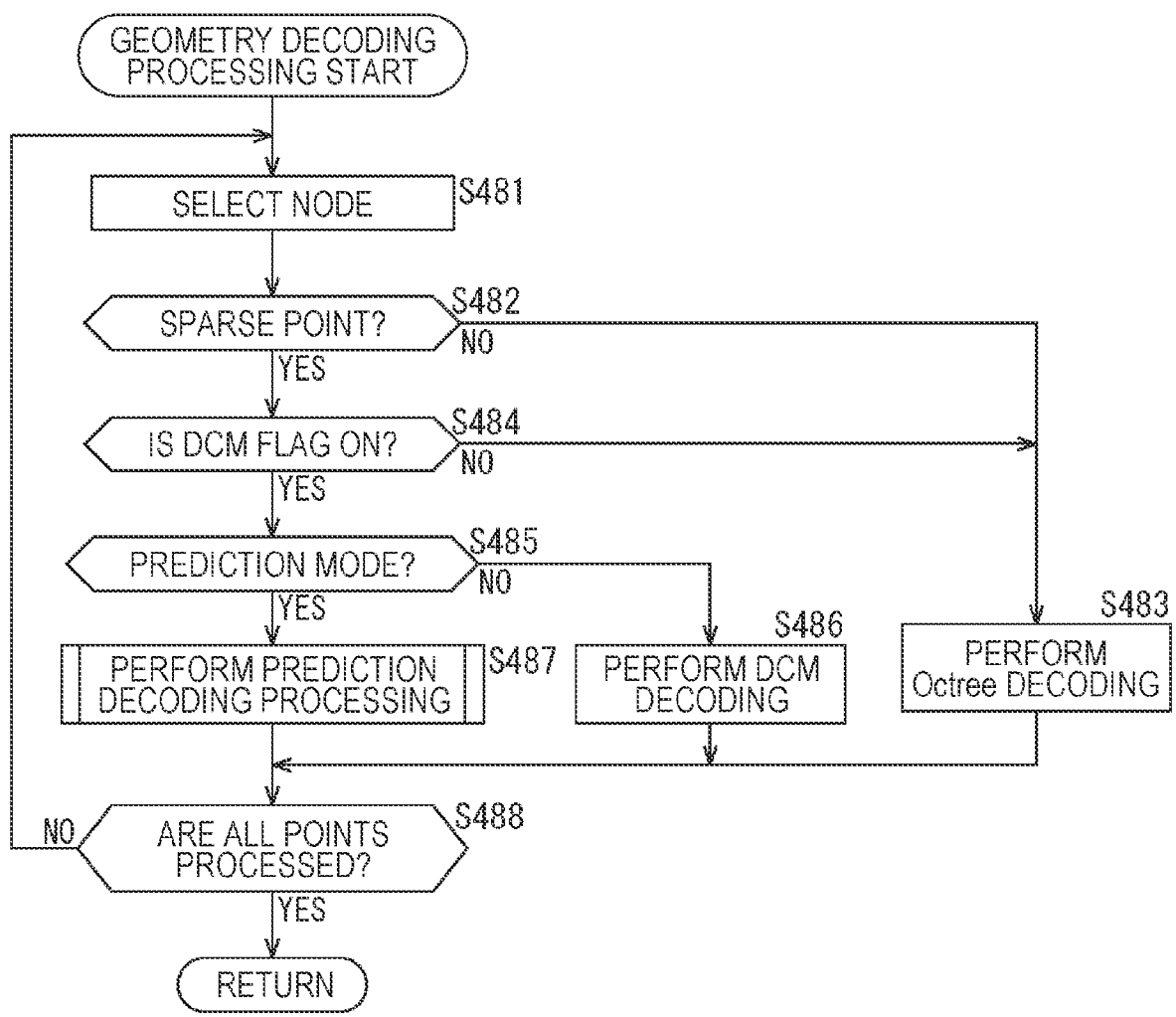
FIG. 20 is a flowchart for illustrating an example of a flow of a geometry decoding process.

Next, an example of a flow of the geometry decoding process executed by the geometry decoding unit 401 of the decoding device 400 corresponding to the above-described voxel data encoding process (FIG. 19) is described with reference to a flowchart in FIG. 20.

Figure 18:
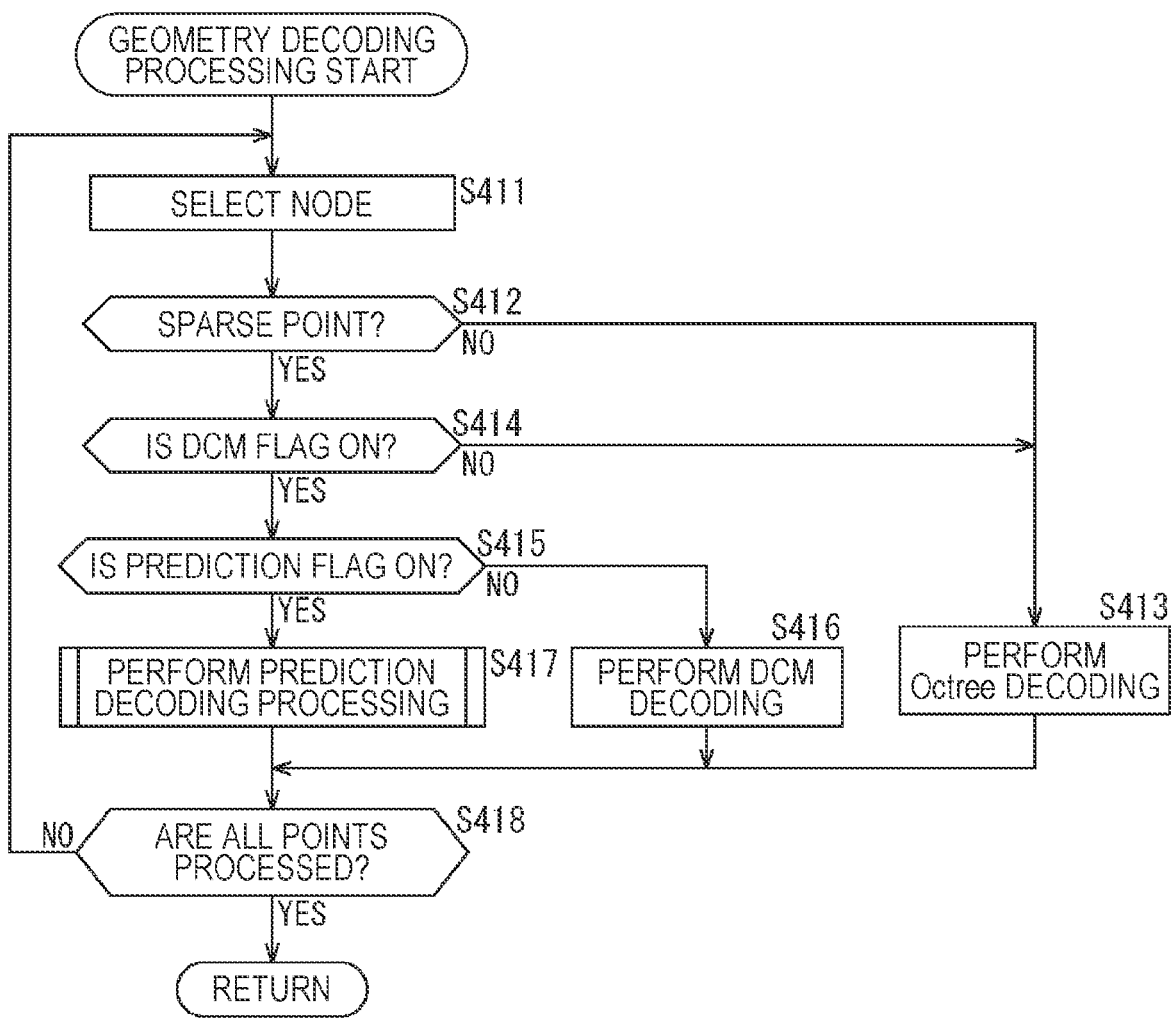
FIG. 18 is a flowchart for illustrating an example of a flow of a decoding process.

In this case also, processes at steps S481 to S484 are executed in a manner similar to that of the respective processes at steps S411 to S414 in FIG. 18.

However, in this case, since the mode information is not transmitted from the encoding side, the mode selection unit 411 performs mode determination similar to that of the mode selection unit 321 instead of referring to the mode information.

That is, at step S485, the mode selection unit 411 determines whether or not to apply the prediction mode. It is sufficient that this determination method corresponds to the determination method performed by the mode selection unit 321. For example, any of the methods 2-2-1 to 2-2-3 described with reference to FIG. 9 may be applied. Furthermore, other determination methods may also be applied.

When it is determined at step S485 that the prediction mode is not applied, the procedure shifts to step S486. At step S486, the DCM decoding unit 413 performs the DCM decoding. Furthermore, when it is determined at step S485 that the prediction mode is applied, the procedure shifts to step S487. At step S487, the prediction decoding unit 414 performs a prediction decoding process. This prediction decoding process is performed in a flow similar to that when described with reference to the flowchart in FIG. 7, for example.

A process at step S488 is performed in a manner similar to that of the process at step S418 in FIG. 18. When it is determined at step S488 that all the points are processed, the geometry decoding process is finished, and the procedure returns to FIG. 17.

By performing the voxel data encoding process and the geometry decoding process as described above, the encoding device 300 and the decoding device 400 may apply the method 2-2 (FIG. 9). Therefore, since the transmission of the mode information becomes unnecessary, the reduction in encoding efficiency may be further suppressed.

4. Third Embodiment

<Prediction Method>

Next, a method of predicting a position of a point to be processed described in the first embodiment and the second embodiment is described.

This prediction is performed by, for example, a prediction processing unit 101 (FIG. 3) of a prediction encoding device 100 and a prediction processing unit 202 (FIG. 6) of a prediction decoding device 200. That is, a prediction encoding unit 324 of an encoding device 300 and a prediction decoding unit 414 of a decoding device 400 perform similar prediction. That is, the following description may be applied to prediction performed in these processing units.

This prediction method is arbitrary. For example, as in a "method 3-1" illustrated in a second stage from the top of a table in FIG. 21, N (N is a natural number) points (also referred to as adjacent points) present in the vicinity of the point to be processed may be made reference points, and a position serving as the center of gravity of the N reference points may be made the position of a prediction point.

That is, a position serving as the center of gravity may be derived from the position of each reference point, and the prediction point located at the center of gravity may be generated (position information of the prediction point indicating the center of gravity of the reference point may be generated). By doing so, the prediction point may be generated by a simple process, so that it is possible to suppress an increase in load of an encoding process and a decoding process by prediction.

Note that it is sufficient that the position of the prediction point is a position that may be derived from the position of each reference point, and may be other than the center of gravity. Furthermore, the number of reference points used for deriving the position of the prediction point may be one or more.

Furthermore, as in a "method 3-1-1" illustrated in a third stage from the top of the table in FIG. 21, it is possible to apply a node (a node of an upper layer of the point to be processed in a tree structure using position information of each point forming a point cloud) to which the point to be processed directly or indirectly belongs such as, for example, a parent node to the reference point (adjacent point). For example, a node determined as DCM (a center point of a voxel) may be applied. Since the node to which the point to be processed directly or indirectly belongs is the center point of the voxel including the point to be processed, it is secured to some extent that this is located in the vicinity of the point to be processed. Therefore, by using such node as the reference point, prediction accuracy is secured to some extent, and a reduction in encoding efficiency may be suppressed. In other words, a distance between such node and the point to be processed may be estimated by the number of levels between the node and the point to be processed. Therefore, by making such node the reference point, the prediction accuracy and the encoding efficiency may be estimated more easily.

Note that, by setting one node (center point of the voxel) determined as the DCM as the reference point and generating the prediction point at the center of gravity (that is, the same position as the reference point) of the one reference point by applying the method 3-1-1, it is possible to obtain a processing result similar to that in a case of the DCM. That is, a difference in position between the point to be processed and the prediction point generated by predicting by this method is information similar to a relative position between the leaf and the node obtained by the DCM.

Furthermore, the number N of reference points may be fixed as in a "method 3-1-2" illustrated in a fourth stage from the top of the table in FIG. 21. By fixing the number of reference points, transmission of information indicating the number of reference points from the encoding side to the decoding side becomes unnecessary. Furthermore, since the reference point may be set more easily, an increase in load of an encoding process and a decoding process may be suppressed.

Furthermore, the number N of reference points may be variable as in a "method 3-1-3" illustrated in a fifth stage from the top of the table in FIG. 21. For example, the number N of the reference points may be set for each point to be processed. Furthermore, for example, the number N of the reference points may be set for each level. By controlling the number N of the reference points, the prediction accuracy may be controlled. Therefore, for example, the prediction accuracy may be improved as a whole, and an increase in encoding efficiency may be further suppressed. Furthermore, it is also possible to predict a position of extrapolation with respect to the reference point. However, when the number N of the reference points is variable, it is necessary to transmit information indicating N from the encoding side to the decoding side.

Furthermore, as in a "method 3-2" illustrated in a sixth stage from the top of the table in FIG. 21, it is also possible to perform fitting of an M-dimensional function by a least square error and the like, for example, from the adjacent N points (N reference points) and generate the prediction point in a position where a distance from the function and the center of the voxel of the node determined as the DCM is smallest. By doing so, the prediction accuracy may be improved as compared with a case of obtaining the prediction point from the center of gravity of the reference point (method 3-1).

Note that, in this case also, the number N of the reference points may be one or more, may be fixed as in a "method 3-2-2" illustrated in a seventh stage from the top of the table in FIG. 21, or may be variable as in a "method 3-2-3" illustrated in an eighth stage from the top of the table in FIG. 21. An effect similar to that in a case of the method 3-1-2 or the method 3-1-3 may be obtained. Similarly, the order M of the function may be fixed or variable. When M is variable, it is necessary to transmit information indicating M from the encoding side to the decoding side.

Furthermore, as in a "method 3-3" illustrated in a ninth stage from the top of the table in FIG. 21, the prediction may be performed using a general interpolation algorithm such as spline interpolation or Lagrange interpolation, for example. By supporting various interpolation algorithms, the prediction may be optimized according to more various cases.

5. Fourth Embodiment

<Difference Quantization>

Next, quantization of a difference in prediction of a position of a point to be processed described in the first embodiment and the second embodiment is described.

The difference is quantized by, for example, a prediction processing unit 101 (FIG. 3) of a prediction encoding device 100. That is, a prediction encoding unit 324 of an encoding device 300 also performs similar quantization. That is, the following description may be applied to the quantization of the difference performed in these processing units.

For example, it is also possible that the quantization of the difference is not performed as in a "method 4-1" illustrated in a second stage from the top of the table in FIG. 22. In this case, a difference quantization unit 114 (FIG. 3) may be omitted, and an increase in load of a prediction process may be suppressed. Furthermore, since an information amount is not reduced, reduction in image quality may be suppressed (point cloud data with higher image quality may be provided).

Furthermore, the difference may be quantized to a predetermined bit amount determined in advance (that is, a fixed bit amount) as in a "method 4-2" illustrated in a third stage from the top of the table in FIG. 22. In a case of this method, since the information amount may be reduced by quantization, a reduction in encoding efficiency may be suppressed (more typically, encoding efficiency may be improved). Furthermore, since the bit amount after the quantization is fixed and known, transmission of information indicating the bit amount is not necessary.

Moreover, the bit amount after the quantization may be made variable for each point as in a "method 4-3" illustrated in a fourth stage from the top of the table in FIG. 22. By doing so, the image quality may be controlled for each point.

Furthermore, the bit amount after the quantization may be made variable for each node as in a "method 4-4" illustrated in a fifth stage from the top of the table in FIG. 22. By doing so, the image quality may be controlled for each node. That is, the image quality of the point cloud may be controlled for each predetermined region in a three-dimensional space. Furthermore, since the designated number of bit amounts to be transmitted is reduced as compared with a case of the method 4-3 in which the bit amount is designated for each point, a reduction in encoding efficiency may be suppressed.

In general, a portion of sparse points often has low importance as data. For example, in a case of LIDAR data to observe a circumstance of an observation point in a circular shape, points tend to be sparser in a region farther from an observation point. Furthermore, the farther from the observation point, the smaller the influence on the observation point is, and the lower the importance as the data tends to be. Therefore, the bit amount may be controlled according to density of the points (nodes). For example, the bit amount of a portion where the points (nodes) are dense may be increased, and the bit amount of a portion where the points (nodes) are sparse may be reduced. By doing so, it is possible to suppress a reduction in encoding efficiency while suppressing a reduction in image quality. Furthermore, the bit amount may be controlled other way round. By doing so, the bit amount of the region where the prediction accuracy is easily reduced may be increased, and the reduction in image quality may be suppressed.

Furthermore, the bit amount after the quantization may be made variable for each level (LoD) of the reference point as in a "method 4-5" illustrated in a sixth stage from the top of the table in FIG. 22. That is, the difference may be quantized such that the bit amount corresponds to the level in which the node is sparse in a tree structure using the position information of each point forming the point cloud.

For example, it is assumed that one node determined as the DCM (the center point of the voxel) is set as the reference point, the prediction point is generated at the center of gravity of the one reference point (that is, the same position as the reference point), and a difference in position between the point to be processed and the prediction point is derived. In this case, the point to be processed is likely to be sparser points as the reference point is located in an upper layer. Furthermore, as the reference point is located in an upper layer, the distance to the point to be processed becomes longer, and the prediction accuracy is more likely to be reduced.

Therefore, this difference is quantized by applying the method 4-5 such that the bit amount is reduced more as the reference point (one node determined as the DCM) is located in an upper layer. By doing so, it is possible to perform bit amount control according to the density of the points, and perform bit amount control according to the prediction accuracy. Therefore, it is possible to suppress the reduction in encoding efficiency while suppressing the reduction in image quality.

Note that, as described above in <4. Third Embodiment>, by setting one node determined as the DCM (center point of the voxel) as the reference point and generating the prediction point at the center of gravity of the one reference point (that is, the same position as the reference point), it is possible to obtain a processing result similar to that in a case of the DCM. That is, the present technology (for example, the method 4-5) may also be applied to quantize the point to which the DCM is applied. In this case also, the effect similar to that in the case of the prediction mode described above may be obtained.

6. Fifth Embodiment

<Processing Order>

Next, a prediction processing order described in the first and second embodiments is described.

This processing order may also be applied to prediction performed by a prediction decoding unit 414 (FIG. 16) of a decoding device 400, for example. That is, the following description may be applied to prediction performed in these processing units.

For example, a process of DCM and a prediction mode may be performed after octree encoding as in a "method 5" illustrated in a top stage of a table in FIG. 23. For example, in a flowchart in FIG. 18 (geometry decoding process), processes at steps S416 and step S417 may be performed after the process at step S413. That is, after the point of a point cloud to which another decoding method is applied is decoded, position information of a point to be processed to which a decoding method using the prediction of the position information of the point to be processed is applied may be predicted to generate the position information of the prediction point.

By adopting such a processing order, the DCM or prediction mode process may be performed using the points reconfigured by an octree process. Therefore, it is possible to suppress a reduction in prediction accuracy and a reduction in encoding efficiency.

Furthermore, for example, a processing order between nodes performed in the DCM and prediction mode may be controlled as in a "method 5-1" illustrated in a second stage from the top of the table in FIG. 23.

For example, as in a "method 5-1-1" illustrated in a third stage from the top of the table in FIG. 23, the nodes to be processed may be selected in descending order of levels (LoD) (that is, in the order from the upper layer to the lower layer). By doing so, it is possible to improve the prediction accuracy when the node determined to be sparse is a lower layer, that is, the prediction accuracy of denser points.

Furthermore, for example, as in a "method 5-1-2" illustrated in a fourth stage from the top of the table in FIG. 23, the nodes to be processed may be selected in ascending order of levels (LoD) (that is, in the order from the lower layer to the upper layer). By doing so, it is possible to improve the prediction accuracy when the node determined to be sparse is an upper layer, that is, the prediction accuracy of sparser points.

That is, in the tree structure using the position information of each point forming the point cloud among the points to which the decoding method using the prediction of the position information of the point to be processed is applied, the point in which the node is sparse in the upper layer may be prioritized, or the point in which the node is sparse in the lower layer may be prioritized, and the prediction may be performed to generate the position information of the prediction point.

Furthermore, the processing order among the nodes may also be controlled within the level (LoD). For example, as in a "method 5-1-3" illustrated in a fifth stage from the top of the table in FIG. 23, each node may be processed in order of Morton code within the level. By processing in order of Morton code, the adjacent points may be reconfigured in order. Therefore, the adjacent point is easily set as the reference point in the prediction.

Furthermore, as in a "method 5-1-4" illustrated in a sixth stage from the top of the table in FIG. 23, each node may be sorted in order of Morton code within the level to be processed in order of binary search. By performing the processing in order of binary search, the prediction point may be easily generated in a position of interpolation with respect to the reference point, and the prediction accuracy may be improved.

Of course, this processing order is arbitrary, and a processing order other than these processing orders may also be applied.

7. Appendix

<Computer>

It is possible that the above-described series of processes is executed by hardware or executed by software. When a series of processes is performed by the software, a program that forms the software is installed on a computer. Herein, the computer includes a computer built in dedicated hardware, a general-purpose personal computer, for example, capable of executing various functions by various programs installed and the like.

Figure 24:
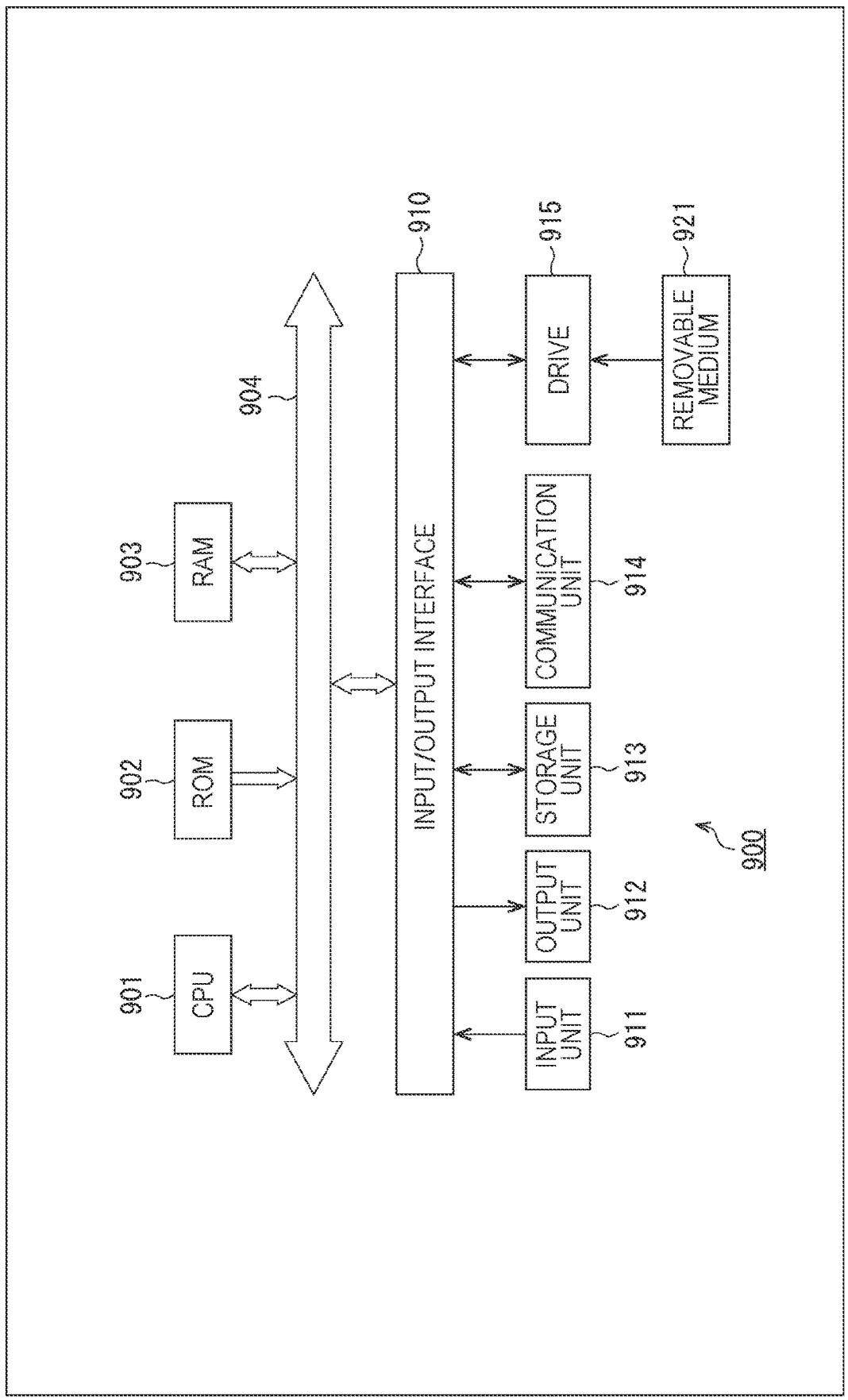
FIG. 24 is a block diagram illustrating a principal configuration example of a computer.

FIG. 24 is a block diagram illustrating a configuration example of the hardware of the computer which executes the above-described series of processes by the program.

In a computer 900 illustrated in FIG. 24, a central processing unit (CPU) 901, a read only memory (ROM) 902, and a random access memory (RAM) 903 are connected to one another through a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal and the like. The output unit 912 includes, for example, a display, a speaker, an output terminal and the like. The storage unit 913 includes, for example, a hard disk, a RAM disk, a nonvolatile memory and the like. The communication unit 914 includes a network interface, for example. The drive 915 drives a removable medium 921 such as a magnetic disk, an optical disk, a magnetooptical disk, or a semiconductor memory.

In the computer configured in the above described manner, the CPU 901 loads the program stored in the storage unit 913, for example, on the RAM 903 through the input/output interface 910 and the bus 904 to execute, so that the above-described series of processes is performed. Data required for the CPU 901 to execute the various processes are also appropriately stored in the RAM 903.

The program executed by the computer (CPU 901) may be recorded in the removable medium 921 as a package medium and the like to be applied, for example. In this case, the program may be installed on the storage unit 913 through the input/output interface 910 by mounting of the removable medium 921 on the drive 915.

Furthermore, the program may also be provided through a wired or wireless transmission medium such as a local area network, the Internet, and digital satellite broadcasting. In this case, the program may be received by the communication unit 914 to be installed on the storage unit 913.

In addition, the program may also be installed in advance on the ROM 902 and the storage unit 913.

<Application Field of Present Technology>

Although a case where the present technology is applied to encoding and decoding of point cloud data is described above, the present technology is not limited to these examples, and may be applied to encoding and decoding of 3D data of an arbitrary standard. That is, as long as there is no contradiction with the present technology described above, specifications of various processes such as an encoding/decoding method and various types of data such as 3D data and metadata are arbitrary. Furthermore, as long as there is no contradiction with the present technology, some processes and specifications described above may be omitted.

The present technology may be applied to an arbitrary configuration. For example, the present technology may be applied to various electronic devices such as a transmitter and a receiver (for example, a television receiver and a mobile phone) in satellite broadcasting, cable broadcasting such as cable TV, distribution on the Internet, and distribution to a terminal by cellular communication, or a device (for example, a hard disk recorder and a camera) that records an image on a medium such as an optical disk, a magnetic disk, and a flash memory, or reproduces an image from the storage medium.

Furthermore, for example, the present technology may also be implemented as a partial configuration of a device, such as a processor (for example, a video processor) as a system large scale integration (LSI) or the like, a module (for example, a video module) using a plurality of processors or the like, a unit (for example, a video unit) using a plurality of modules or the like, or a set (for example, a video set) obtained by further adding other functions to a unit.

Furthermore, for example, the present technology may also be applied to a network system including a plurality of devices. For example, the present technology may be implemented as cloud computing shared and processed in cooperation by a plurality of devices via a network. For example, the present technology may be implemented in a cloud service that provides a service regarding an image (moving image) to an arbitrary terminal such as a computer, an audio visual (AV) device, a portable information processing terminal, or an Internet of Things (IoT) device.

Note that, in this specification, a system is intended to mean a set of a plurality of components (devices, modules (parts) and the like) and it does not matter whether all the components are in the same casing or not. Therefore, a plurality of devices accommodated in different casings and connected through a network and one device obtained by accommodating a plurality of modules in one casing are the systems.

<Field and Application to Which Present Technology is Applicable>

The system, device, processing unit and the like to which the present technology is applied may be used in arbitrary fields such as traffic, medical care, crime prevention, agriculture, livestock industry, mining, beauty care, factory, household appliance, weather, and natural surveillance, for example. Furthermore, the application thereof is also arbitrary.

<Others>

Note that, in this specification, the "flag" is information for identifying a plurality of states, and includes not only information used for identifying two states of true (1) and false (0) but also information capable of identifying three or more states. Therefore, the value that may be taken by the "flag" may be, for example, a binary of 1/0 or a ternary or more. That is, the number of bits forming this "flag" is arbitrary, and may be one bit or a plurality of bits. Furthermore, since the identification information (including the flag) is assumed to include not only the identification information but also the difference information of the identification information with respect to certain reference information in the bitstream, in this specification, the "flag" and the "identification information" include not only the information but also the difference information with respect to the reference information.

Furthermore, various types of information (metadata and the like) regarding the encoded data (bitstream) may be transmitted or recorded in any form as long as the information is associated with the encoded data. Herein, the term "associate" is intended to mean to make, when processing one data, the other data available (linkable), for example. That is, the data associated with each other may be collected as one data or may be made individual data. For example, information associated with the encoded data (image) may be transmitted on a transmission path different from that of the encoded data (image). Furthermore, for example, the information associated with the encoded data (image) may be recorded in a recording medium different from that of the encoded data (image) (or another recording area of the same recording medium). Note that, this "association" may be not the entire data but a part of data. For example, an image and information corresponding to the image may be associated with each other in arbitrary units such as a plurality of frames, one frame, a part in the frame or the like.

Note that, in this specification, the terms "synthesize", "multiplex", "add", "integrate", "include", "store, "put", "inlet", "insert" and the like mean combining a plurality of objects into one, for example, such as combining the encoded data and metadata into one data, and mean one method of "associate" described above.

Furthermore, the embodiment of the present technology is not limited to the above-described embodiments and various modifications may be made without departing from the gist of the present technology.

For example, it is also possible to divide the configuration described as one device (or processing unit) into a plurality of devices (or processing units). Other way round, it is also possible to put the configurations described above as a plurality of devices (or processing units) together as one device (or processing unit). Furthermore, it goes without saying that it is possible to add a configuration other than the above-described one to the configuration of each device (or each processing unit). Moreover, it is also possible that a part of the configuration of a certain device (or processing unit) is included in the configuration of another device (or another processing unit) as long as a configuration and operation as an entire system are substantially the same.

Furthermore, for example, the above-described program may be executed in an arbitrary device. In this case, it is only required that the device has necessary functions (functional blocks and the like) so that necessary information may be obtained.

Furthermore, for example, each step of one flowchart may be executed by one device, or may be shared and executed by a plurality of devices. Moreover, when a plurality of processes is included in one step, the plurality of processes may be executed by one device, or may be shared and executed by a plurality of devices. In other words, a plurality of processes included in one step may be executed as processes of a plurality of steps. Conversely, the processes described as a plurality of steps may be collectively executed as one step.

Furthermore, for example, the program executed by the computer may be such that processes at steps of describing the program are executed in chronological order in the order described in this specification or that the processes are executed in parallel or individually executed at required timing such as when a call is issued. That is, as long as there is no inconsistency, the processes at respective steps may be executed in order different from the order described above. Moreover, the process at the step of describing the program may be executed in parallel with the process of another program, or may be executed in combination with the process of another program.

Furthermore, for example, as long as there is no inconsistency, each of a plurality of technologies regarding the present technology may be independently implemented as a single one. It goes without saying that it is also possible to implement by combining a plurality of arbitrary present technologies. For example, a part of or the entire present technology described in any of the embodiments may be implemented in combination with a part of or the entire present technology described in other embodiments. Furthermore, a part of or the entire arbitrary present technology described above may be implemented in combination with other technologies not described above.

Note that, the present technology may also have following configurations.

(1) An information processing device provided with:
a prediction unit that predicts position information of a point to be processed on the basis of position information of a reference point and generates position information of a prediction point as for a point cloud that represents an object having a three-dimensional shape as a point group;
a difference derivation unit that derives a difference between the position information of the prediction point generated by the prediction unit and the position information of the point to be processed; and
an encoding unit that encodes the difference derived by the difference derivation unit and generates a bitstream.

(2) The information processing device according to (1), in which
the prediction unit makes a single or a plurality of points located in the vicinity of the point to be processed the reference point, and generates the position information of the prediction point indicating a center of gravity of the reference point.

(3) The information processing device according to (1), in which
the prediction unit makes a single or a plurality of points located in the vicinity of the point to be processed the reference point, derives a function using the reference point, and generates the position information of the prediction point using the function.

(4) The information processing device according to (1), in which
the prediction unit sets a node of an upper layer of the point to be processed in a tree structure using position information of each point forming the point cloud as the reference point.

(5) The information processing device according to any one of (1) to (4), further provided with:
a difference quantization unit that quantizes the difference derived by the difference derivation unit, in which
the encoding unit encodes the difference quantized by the difference quantization unit and generates the bitstream.

(6) The information processing device according to (5), in which
the difference quantization unit quantizes the difference to a bit amount according to a level in which a node is sparse in a tree structure using position information of each point forming the point cloud, and
the encoding unit encodes the difference quantized to the bit amount corresponding to the level by the difference quantization unit and generates the bitstream.

(7) The information processing device according to any one of (1) to (6), further provided with:
a selection unit that selects whether to apply a method using prediction of the position information of the point to be processed or to apply a direct coding mode (DCM) as the encoding method of the point to be processed, in which
when the method using the prediction is selected by the selection unit,
the prediction unit performs the prediction and generates the position information of the prediction point,
the difference derivation unit derives the difference, and
the encoding unit encodes the difference and generates the bitstream.

(8) The information processing device according to (7), in which
the selection unit selects a decoding method of the point to be processed according to a level in which a node is sparse in a tree structure using position information of each point forming the point cloud.

(9) The information processing device according to (7) or (8), in which
the encoding unit generates the bitstream including information indicating the encoding method of the point to be processed selected by the selection unit.

(10) An information processing method provided with:
predicting position information of a point to be processed on the basis of position information of a reference point and generating position information of a prediction point as for a point cloud that represents an object having a three-dimensional shape as a point group;
deriving a difference between the position information of the prediction point that is generated and the position information of the point to be processed; and
encoding the difference that is derived and generating a bitstream.

(11) An information processing device provided with:
a decoding unit that decodes encoded data encoded using prediction of position information of a point to be processed of a point cloud that represents an object having a three-dimensional shape as a point group, and generates a difference between position information of a prediction point predicted on the basis of position information of a reference point and the position information of the point to be processed corresponding to the prediction point;
a prediction unit that predicts the position information of the point to be processed on the basis of the position information of the reference point and generates the position information of the prediction point as for the point cloud; and
an addition unit that adds the position information of the prediction point generated by the prediction unit to the difference generated by the decoding unit and derives the position information of the point to be processed.

(12) The information processing device according to (11), in which
the prediction unit makes a single or a plurality of points located in the vicinity of the point to be processed the reference point, and generates the position information of the prediction point indicating a center of gravity of the reference point.

(13) The information processing device according to (11), in which
the prediction unit makes a single or a plurality of points located in the vicinity of the point to be processed the reference point, derives a function using the reference point, and generates the position information of the prediction point using the function.

(14) The information processing device according to any one of (11) to (13), in which
the prediction unit sets a node of an upper layer of the point to be processed in a tree structure using position information of each point forming the point cloud as the reference point.

(15) The information processing device according to any one of (11) to (14), further provided with:
a selection unit that selects whether to apply a method using prediction of the position information of the point to be processed or to apply a direct coding mode (DCM) as a decoding method of the point to be processed, in which
when the method using the prediction is selected by the selection unit,
the decoding unit decodes the encoded data and generates the difference,
the prediction unit performs the prediction and generates the position information of the prediction point, and
the addition unit adds the position information of the prediction point to the difference.

(16) The information processing device according to (15), in which
the selection unit selects the decoding method of the point to be processed on the basis of information indicating an encoding method of the point to be processed included in a bitstream.

(17) The information processing device according to (15), in which
the selection unit selects the decoding method of the point to be processed according to a level in which a node is sparse in a tree structure using position information of each point forming the point cloud.

(18) The information processing device according to any one of (11) to (17), in which
the prediction unit predicts the position information of the point to be processed to which a decoding method using the prediction of the position information of the point to be processed is applied and generates the position information of the prediction point after decoding a point to which another decoding method is applied of the point cloud.

(19) The information processing device according to any one of (11) to (18), in which
in a tree structure using position information of each point forming the point cloud among points to which a decoding method using the prediction of the position information of the point to be processed is applied, the prediction unit prioritizes a point in which a node is sparse in an upper layer, or prioritizes a point in which a node is sparse in a lower layer, and performs the prediction to generate the position information of the prediction point.

(20) An information processing method provided with:
decoding encoded data encoded using prediction of position information of a point to be processed of a point cloud that represents an object having a three-dimensional shape as a point group, and generating a difference between position information of a prediction point predicted on the basis of position information of a reference point and the position information of the point to be processed corresponding to the prediction point;
predicting the position information of the point to be processed on the basis of the position information of the reference point and generating the position information of the prediction point as for the point cloud; and
adding the position information of the prediction point that is generated to the difference that is generated and deriving the position information of the point to be processed.

REFERENCE SIGNS LIST

100 Prediction encoding device
101 Prediction processing unit
102 Lossless encoding unit
111 Reference point setting unit
112 Prediction point generation unit
113 Difference derivation unit
114 Difference quantization unit
200 Prediction decoding device
201 Lossless decoding unit
202 Prediction processing unit
211 Reference point setting unit
212 Prediction point generation unit
213 Difference addition unit
300 Encoding device
301 Geometry encoding unit
302 Geometry decoding unit
303 Point cloud generation unit
304 Attribute encoding unit
305 Bitstream generation unit
311 Bounding box setting unit
312 Voxel setting unit
313 Encoding unit
321 Mode selection unit
322 Octree encoding unit
323 DCM encoding unit
324 Prediction encoding unit
325 Metadata generation unit
400 Decoding device
401 Geometry decoding unit
402 Attribute decoding unit
403 Point cloud generation unit
411 Mode selection unit
412 Octree decoding unit
413 DCM decoding unit
414 Prediction decoding unit

The invention claimed is:
1. An information processing device comprising:
circuitry configured to:
select, as an encoding method for a point cloud representing a three-dimensional object, from among
a first encoding method in which target position information of a target point is derived on a basis of prediction position information of a prediction point predicted using reference position information of a reference point in an octree structure of the point cloud, or a second encoding method in which the target position information is directly derived on a basis of a relative distance from a leaf of the octree structure;
derive, in the selected first encoding method, the prediction position information on a basis of the reference position information and the target position information;
derive a difference between the prediction position information and the target position information; and
encode the reference position information and the difference between the prediction position information and the target position information.

2. The information processing device according to claim 1, wherein
the reference point includes a plurality of points in a vicinity of the target point, and
the circuitry is further configured to derive the prediction position information indicating a center of gravity of the plurality of points.

3. The information processing device according to claim 1, wherein
the reference point includes a plurality of points in a vicinity of the target point, and
the circuitry is further configured to derive the prediction position information on a basis of a function based on the plurality of points.

4. The information processing device according to claim 1, wherein
the circuitry is further configured to set, as the reference point, a node of an upper layer of the target point in the octree structure.

5. The information processing device according to claim 1, wherein
the circuitry is configured to select an encoding method of the target point on a basis of a level of the octree structure in which a node is sparse.

6. The information processing device according to claim 1, wherein
the circuitry is further configured to derive the bitstream including information indicating the encoding method of the target point.

7. An information processing method comprising:
selecting, as an encoding method for a point cloud representing a three-dimensional object, from among
a first encoding method in which target position information of a target point is derived on a basis of prediction position information of a prediction point predicted using reference position information of a reference point in an octree structure of the point cloud, or
a second encoding method in which the target position information is directly derived on a basis of a relative distance from a leaf of the octree structure;
deriving, in the selected first encoding method, the prediction position information on a basis of the reference position information and the target position information;
deriving a difference between the prediction position information and the target position information; and
encoding the reference position information and the difference to derive a bitstream.

8. An information processing device comprising:
circuitry configured to:
select, as a decoding method for a point cloud representing a three-dimensional object, from among
a first decoding method in which target position information of a target point is derived on a basis of prediction position information of a prediction point predicted using reference position information of a reference point in an octree structure of the point cloud, or
a second decoding method in which the target position information is directly derived on a basis of a relative distance from a leaf of the octree structure;
decode encoded data to derive
the reference position information, and
a difference between the prediction position information and the target position information; and
derive the target position information on a basis of the prediction position information and the difference between the prediction position information and the target position information.

9. The information processing device according to claim 8, wherein
the reference point includes a plurality of points in a vicinity of the target point, and
the circuitry is further configured to derive the prediction position information indicating a center of gravity of the plurality of points.

10. The information processing device according to claim 8, wherein
the reference point includes a plurality of points in a vicinity of the target point, and
the circuitry is further configured to derive the prediction position information on a basis of a function based on the plurality of points.

11. The information processing device according to claim 8, wherein
the circuitry is further configured to set, as the reference point, a node of an upper layer of the target point in the octree structure.

12. The information processing device according to claim 8, wherein
the selection unit selects the decoding method of a point to be processed on a basis of information indicating an encoding method of the point to be processed included in a bitstream.

13. The information processing device according to claim 8, wherein
the circuitry is further configured to select the decoding method of the target point on a basis of a level of the octree structure in which a node is sparse.

14. The information processing device according to claim 8, wherein
the circuitry is further configured to
decode the encoded data on a basis of a third decoding method based on the octree configuration to derive the reference position information, and
perform the first decoding method after performing the third decoding method.

15. The information processing device according to claim 8, wherein,
the circuitry is further configured to prioritize, for the first decoding method, the target point in an upper layer in which a node of the octree structure is sparse.

16. The information processing device according to claim 8, wherein
the circuitry is configured to prioritize, for the first decoding method, the target point in a lower layer in which a node of the octree structure is sparse.

17. An information processing method comprising:
selecting, as a decoding method for a point cloud representing a three-dimensional object, from among
a first decoding method in which target position information of a target point is derived on a basis of prediction position information of a prediction point predicted using reference position information of a reference point in an octree structure of the point cloud, or
a second decoding method in which the target position information is directly derived on a basis of a relative distance from a leaf of the octree structure;
decoding encoded data to derive
the reference position information, and
a difference between the prediction position information and the target position information; and
deriving the target position information on a basis of the prediction position information and the difference.

18. An information processing device comprising:
circuitry configured to
decode encoded data of a point cloud representing a three-dimensional object to derive
reference position information of a reference point based on an octree-structure-based decoding method depending on an octree structure of the point cloud, and
a difference between prediction position information of a prediction point and target position information of a target point, and
derive the target position information on a basis of the prediction position information and the difference.

19. An information processing method comprising:
decoding encoded data of a point cloud representing a three-dimensional object to derive
reference position information of a reference point based on an octree-structure-based decoding method depending on an octree structure of the point cloud, and
a difference between prediction position information of a prediction point and target position information of a target point; and
deriving the target position information on a basis of the prediction position information and the difference.

20. An information processing device comprising:
circuitry configured to
derive, for a point cloud representing a three-dimensional object, prediction position information of a prediction point on a basis of target position information of a target point and reference position information of a reference point,
derive a difference between the prediction position information and the target position information of the target point, and
quantize the point cloud to have an octree structure,
quantize the difference to have a bit amount corresponding to a selected level of the octree structure, the selected level satisfying a condition that a number of nodes belonging to the selected level is less than a predetermined threshold, and
encode the difference to derive a bitstream.

21. The information processing device according to claim 20, wherein
the condition that the number of nodes belonging to the selected level is less than the predetermined threshold is satisfied by a node of the selected level other than a parent node of the target point.

22. An information processing method comprising:
deriving, for a point cloud representing a three-dimensional object, prediction position information of a prediction point on a basis of target position information of a target point and reference position information of a reference point;
deriving a difference between the prediction position information and the target position information;
quantizing the point cloud to have an octree structure;
quantizing the difference to have a bit amount corresponding to a selected level of the octree structure, the selected level satisfying a condition that a number of nodes belonging to the selected level is less than a predetermined threshold; and
encoding the difference to derive a bitstream.

\* \* \* \* \*